(12) United States Patent
Ehrlich et al.

(10) Patent No.: US 11,422,710 B2
(45) Date of Patent: Aug. 23, 2022

(54) HANDLING OF VERIFICATION DATA IN DISK DRIVE CACHE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Richard M. Ehrlich, Saratoga, CA (US); Eric R. Dunn, Cupertino, CA (US); Fernando A. Zayas, Rangiora (NZ); Shoichi Aoki, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 68 days.

(21) Appl. No.: 16/994,375

(22) Filed: Aug. 14, 2020

(65) Prior Publication Data

US 2022/0050602 A1 Feb. 17, 2022

(51) Int. Cl.
*G06F 3/06* (2006.01)

(52) U.S. Cl.
CPC .......... *G06F 3/0619* (2013.01); *G06F 3/0616* (2013.01); *G06F 3/0653* (2013.01); *G06F 3/0658* (2013.01); *G06F 3/0659* (2013.01); *G06F 3/0676* (2013.01)

(58) Field of Classification Search
CPC .... G06F 3/0619; G06F 3/0616; G06F 3/0656; G06F 3/0653; G06F 3/0658; G06F 3/0659; G06F 3/0676
See application file for complete search history.

(56) References Cited

U.S. PATENT DOCUMENTS

| | | | |
|---|---|---|---|
| 9,171,574 B1 | 10/2015 | Zaw et al. | |
| 9,311,939 B1* | 4/2016 | Malina | G11B 19/042 |
| 10,037,779 B1* | 7/2018 | Mendonsa | G11B 21/08 |
| 2012/0194940 A1* | 8/2012 | Yoshida | G11B 20/10296 360/53 |
| 2013/0148225 A1 | 6/2013 | Coker et al. | |
| 2015/0378621 A1* | 12/2015 | Bruner | G06F 12/0833 711/114 |
| 2017/0011769 A1 | 1/2017 | Shang et al. | |
| 2017/0147215 A1* | 5/2017 | Cronauer | G06F 3/0643 |
| 2017/0177236 A1 | 6/2017 | Haratsch et al. | |
| 2017/0178680 A1* | 6/2017 | Haskins, Jr. | G06F 3/065 |
| 2017/0344276 A1* | 11/2017 | Sutardja | G06F 3/0676 |
| 2018/0366158 A1* | 12/2018 | Luo | G06F 12/0868 |
| 2020/0192795 A1* | 6/2020 | Cai | G06F 11/0793 |
| 2020/0210100 A1* | 7/2020 | Li | G06F 3/0644 |

* cited by examiner

*Primary Examiner* — Tracy A Warren
(74) *Attorney, Agent, or Firm* — Kim & Stewart LLP

(57) ABSTRACT

In a magnetic recording drive that includes a shingled magnetic recording (SMR) region and a conventional magnetic recording (CMR) region, the quantity of validation data that is stored by the CMR region is reduced. In the magnetic recording drive, verification data stored in the CMR region is invalidated under certain circumstances, including when an SMR band is closed, when an SMR band is indicated by a host to be reused, when an SMR band is indicated to be finished, and when a last data track of an SMR has data stored therein.

19 Claims, 20 Drawing Sheets

HANDLING OF VERIFICATION DATA IN DISK DRIVE CACHE

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, groups of adjacent data tracks on a magnetic disk are written so as to overlap, and therefore overwrite, a portion of the previously written data track. As a result, the data tracks written in an SMR HDD are reduced in width to allow for increased data density in an HDD.

A significant drawback of SMR HDDs is that the data stored in an SMR region of an HDD may be unreliable when written under certain conditions. For example, data written when the temperature of an HDD is outside the normal operating range for the HDD is less reliable than data written when the temperature of the HDD is within the normal operating range of the HDD. Consequently, data written under abnormal conditions is typically verified (read and checked for accuracy) as part of the data storage process. Because the integrity of data written to a first track in an SMR HDD may be further degraded when a second adjacent track is written, verification of data stored in the first track is preferably performed after data are written to the second track. Such verification involves reading the data stored in the first data track and comparing the data as read to a known accurate copy of the data. For example, the accurate copy of such data may be stored in a buffer of the HDD (such as dynamic random access memory or other volatile memory) or in a conventional magnetic recording (CMR) region of the HDD. In this way, the integrity of the data stored in the first data track can be confirmed.

To enable verification of a first data track after a second adjacent data track has been written, an SMR HDD retains an accurate copy of the data that are stored in the first data track until after the integrity of the first data track has been verified. In this way, an accurate version of the data is not lost in the event that the integrity of data stored in the first data track is not acceptable. Thus, an accurate copy of the data stored in the first data track must be retained until after the second adjacent data track is written and verification of the first data track is complete. An SMR HDD typically includes a large number of SMR regions (also referred to as "bands" or "roofs"), and each SMR region may include a most recently-written data track that requires verification. As a result, an SMR HDD can be faced with storing a large quantity of unverified data that exceeds the capacity of the HDD buffer and is instead stored in a CMR region of the HDD that is referred to as a "media cache." The media cache of an SMR HDD is generally configured to store orders of magnitude more data than the buffer.

SUMMARY

One or more embodiments provide systems and methods for storing data in a disk drive that includes an SMR region and a CMR region. According to the embodiments, verification data stored in the CMR region is invalidated under certain circumstances, including when an SMR band is closed, when an SMR band is indicated by a host to be reused, when an SMR band is indicated to be finished, and when a last data track of an SMR has data stored therein. Thus, the quantity of validation data that is stored by the CMR region is reduced.

A disk drive, according to another embodiment, a shingled magnetic recording region that includes a plurality of data storage bands, a conventional magnetic recording region that includes a cache, and a controller. The controller is configured to: receive from a host a first set of data for storage while an operating temperature of the disk drive is an abnormal temperature; write a first copy of the first set of data to a first track of a data storage band in the plurality of data storage bands; write a second copy of the first set of data to the cache; verify the first copy of the first set of data; and, after verifying the first copy of the first set of data, invalidate the second copy of the first set of data from the cache.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
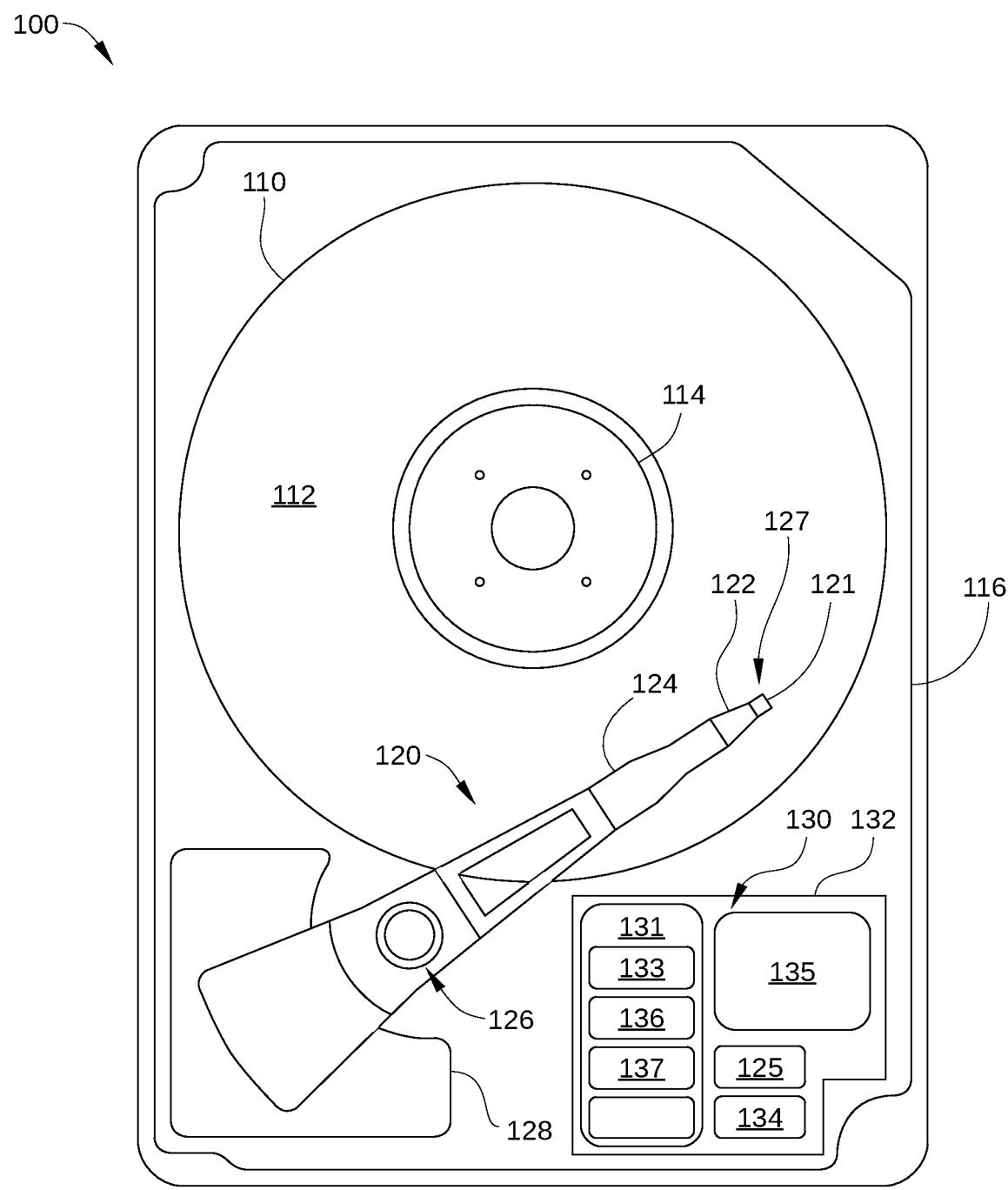
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read channel 137 and microprocessor-based controller 133 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 2.

Figure 2:
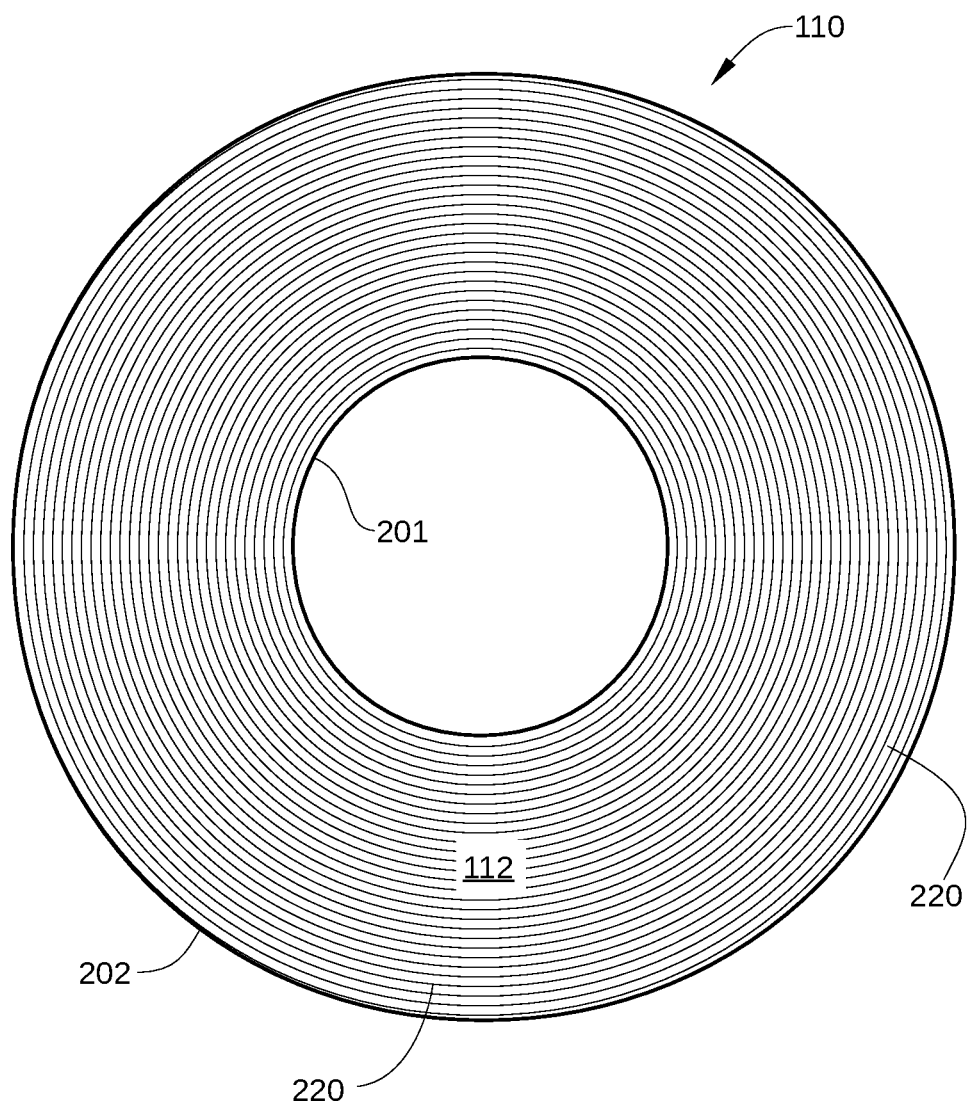
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3.

Figure 3:
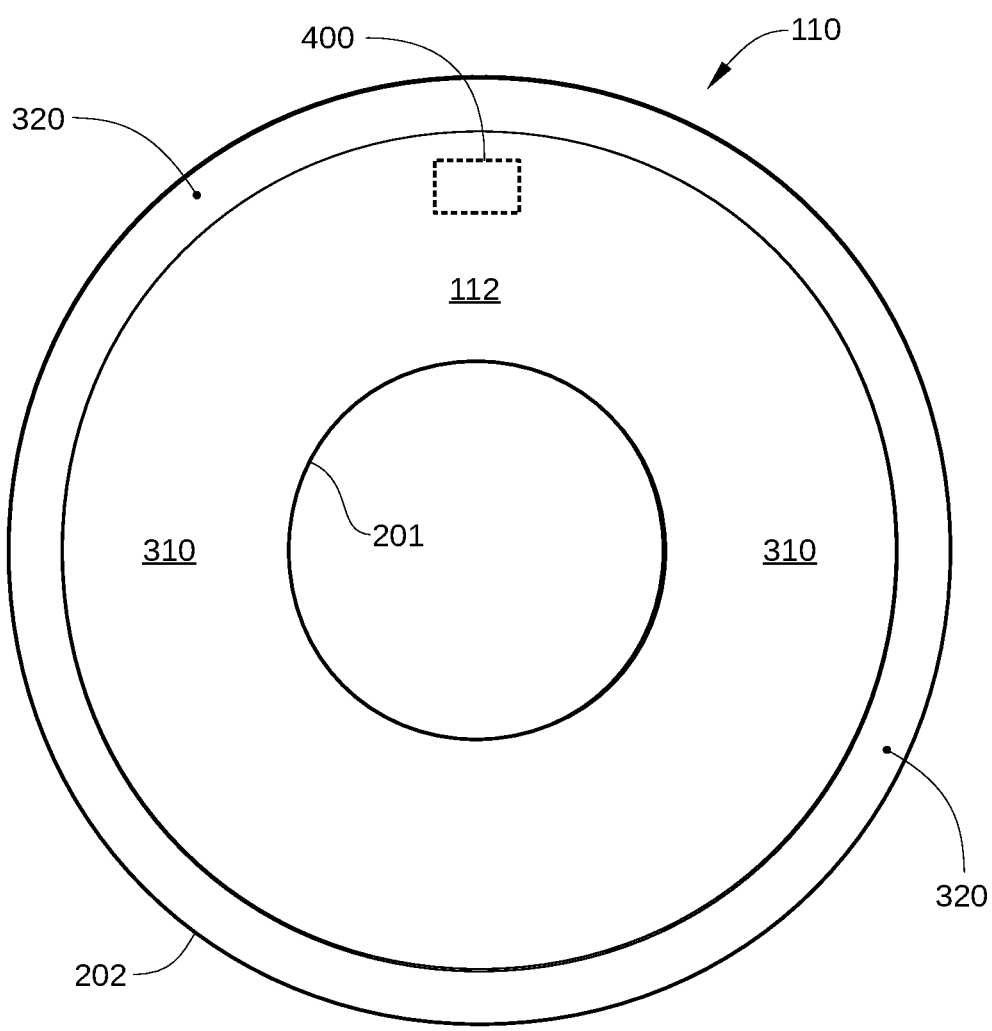
FIG. 3 schematically illustrates a shingled magnetic recording (SMR) region of a recording surface of a storage disk and a media-cache region of the recording surface, according to an embodiment.

FIG. 3 schematically illustrates a shingled magnetic recording (SMR) region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate OD 202 of recording surface 112 and SMR region 310 includes the remainder of recording surface 112. In other embodiments, media-cache region 320 may be disposed in any other region of recording surface 112, for example in a region proximate ID 201, and/or in a middle diameter (MD) region of recording surface 112, and/or distributed across a number of regions between the OD 202 and ID 201. Generally, SMR region 310 includes the majority of the storage capacity of recording surface 112.

SMR region 310 is a shingled magnetic recording (SMR) region of recording surface 112 that includes data storage tracks 220 that are arranged in groups of data storage tracks, referred to variously in the art as "bands," "zones," or "roofs." Each band of data storage tracks 220 is typically separated from adjacent bands by guard regions, which are inter-band gaps in which no data storage tracks are formed. Further, the data storage tracks formed in SMR region 310 are written in an SMR format, and therefore overlap adjacent data storage tracks in the same band. Thus, each band in SMR region 310 includes a plurality of overlapping data storage tracks that each have a width that is significantly narrower than a width of the write element included in read/write head 127. One embodiment of such a band is illustrated in FIG. 4.

Figure 4:
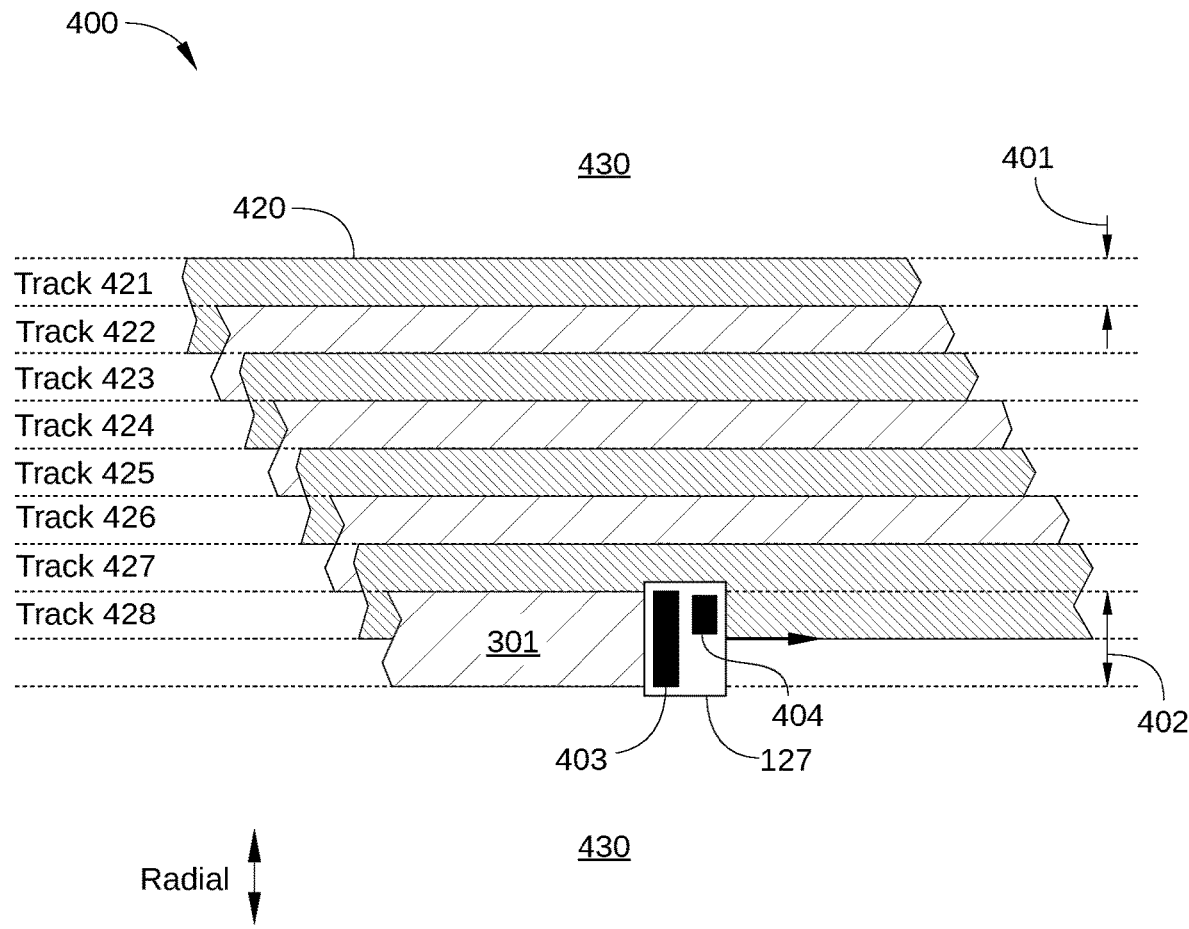
FIG. 4 is a schematic illustration of a portion of a recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-428, and is separated from adjacent bands (not shown) by guard regions 430. As shown, each of SMR data tracks 421-428 overlaps and/or is overlapped in the radial direction by at least one adjacent SMR data track. As a result, each of SMR data tracks 421-428 has a readable width 401 that is significantly less than an as-written width 402. It is noted that in the embodiment illustrated in FIG. 4, band 420 only includes eight SMR data tracks, whereas in practice band 420 may include up to one hundred or more SMR data tracks.

Also shown in FIG. 4 is read/write head 127, which is configured with a write head 403 and a read head 404 that are each designed for SMR. As such, read head 404 is configured with a width that is approximately equal to or smaller than readable width 401, and is positioned within read/write head 127 to facilitate reading of SMR data tracks 421-428. Furthermore, write head 403 is positioned within read/write head 127 to facilitate writing of SMR data tracks 421-428 with as-written width 402. In accordance with the principle of SMR, as-written width 402 exceeds readable width 401, for example by a factor of two. Thus, as a particular one of SMR data tracks 421-428 is written, write head 403 is positioned to overlap a significant portion of the preceding SMR data track, reducing the preceding SMR data track to readable width 401. When data are written under abnormal conditions, the integrity of data stored in an SMR data track of readable width 401 may be degraded, and therefore is typically verified (read and checked for accuracy) as part of the data storage process.

As noted previously, verification of data is preferably performed on a particular sector of an SMR data storage track after a radially adjacent sector of an over-lapping SMR data track has also been written. This is because the radially adjacent sector partially overwrites the particular sector to be verified in the radial direction, reducing that particular sector to readable width 401. According to various embodiments, until the radially adjacent sector of the over-lapping SMR data track has been written and verification of data stored by the particular sector has been performed, a copy of data stored in the particular sector is stored in media cache region 320. Further, in some embodiments, verification is performed in an SMR band (e.g., band 420) on sectors after which a predetermined number of additional sectors have been written to the SMR band. In some embodiments, the predetermined number of sectors is equal to an integral multiple of the number of sectors per SMR data track at an outer diameter of recording surface 400. For example, in one such embodiment, the predetermined number of sectors is equal to the number of sectors per SMR data track at the outer diameter of recording surface 400. In such an embodiment, verification is performed in the SMR band on sectors after which a number of additional sectors have been written that is equal to the number of sectors per SMR data track at the outer diameter of recording surface 400. In such embodiments, a copy of the data stored in the remaining unverified sectors is stored in media cache region 320. Thus, in the above example, the quantity of data for which a copy is stored in media cache region 320 is equal to the quantity of data stored by a data track at the outer diameter of recording surface 400.

Returning to FIG. 3, media-cache region 320 is configured to store media-cache entries during normal operation of HDD 100, such as sets of data that are stored in SMR region 310 and are unverified. As such, media-cache region 320 includes conventional data storage tracks that are substantially non-overlapping, i.e., data storage tracks that are written in a conventional magnetic recording (CMR) format rather than in an SMR format. As a result, media-cache region 320 can be used to store random block writes and selectively overwrite existing data. Thus, when data are written to a particular sector of a data storage track in media-cache region 320 and are determined as part of a verification process to be unverifiable, that particular sector of the data storage track can be immediately rewritten. By contrast, to overwrite a portion of an SMR track, such as a specific sector that stores corrupted or otherwise unverifiable data, the entire band of SMR tracks that includes that specific sector generally must be re-written.

Another difference between data stored in media-cache region 320 from data stored in SMR region 310 is that the data stored in media-cache region 320 can be verified at any time after being written to media-cache region 320. That is, when data are written to a particular data storage track in media-cache region 320, there is little or no advantage to waiting for data to be written to an adjacent data storage track in media-cache region 320 before verifying the data written to the particular data storage track. Thus, in a data storage process in which data are stored in a data storage track of media-cache region 320, such data can be verified immediately after being written to the data storage track, and an associated copy of such data can be removed from a data buffer of HDD 100, such as RAM 134 (shown in FIG. 1).

Data Storage and Verification

Figure 5A:
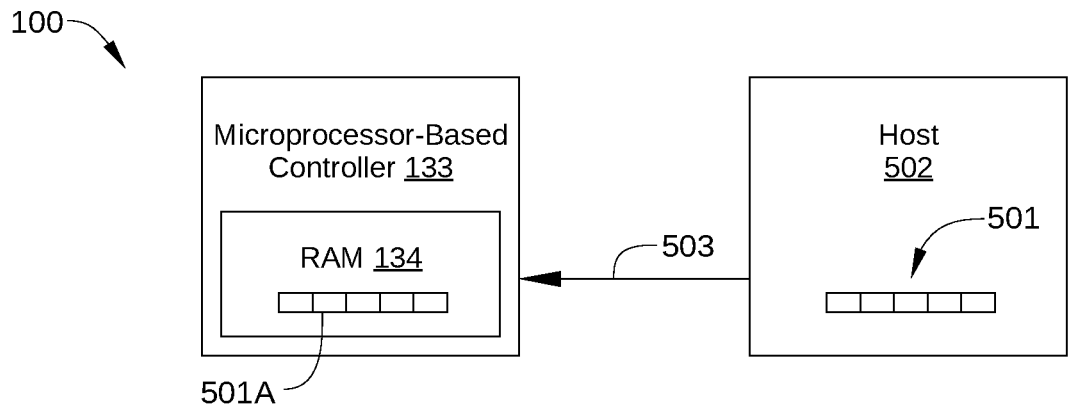
FIG. 5A schematically illustrates the hard disk drive of FIG. 1 receiving a set of data from a host via a write command, according to an embodiment.
Figure 5A:
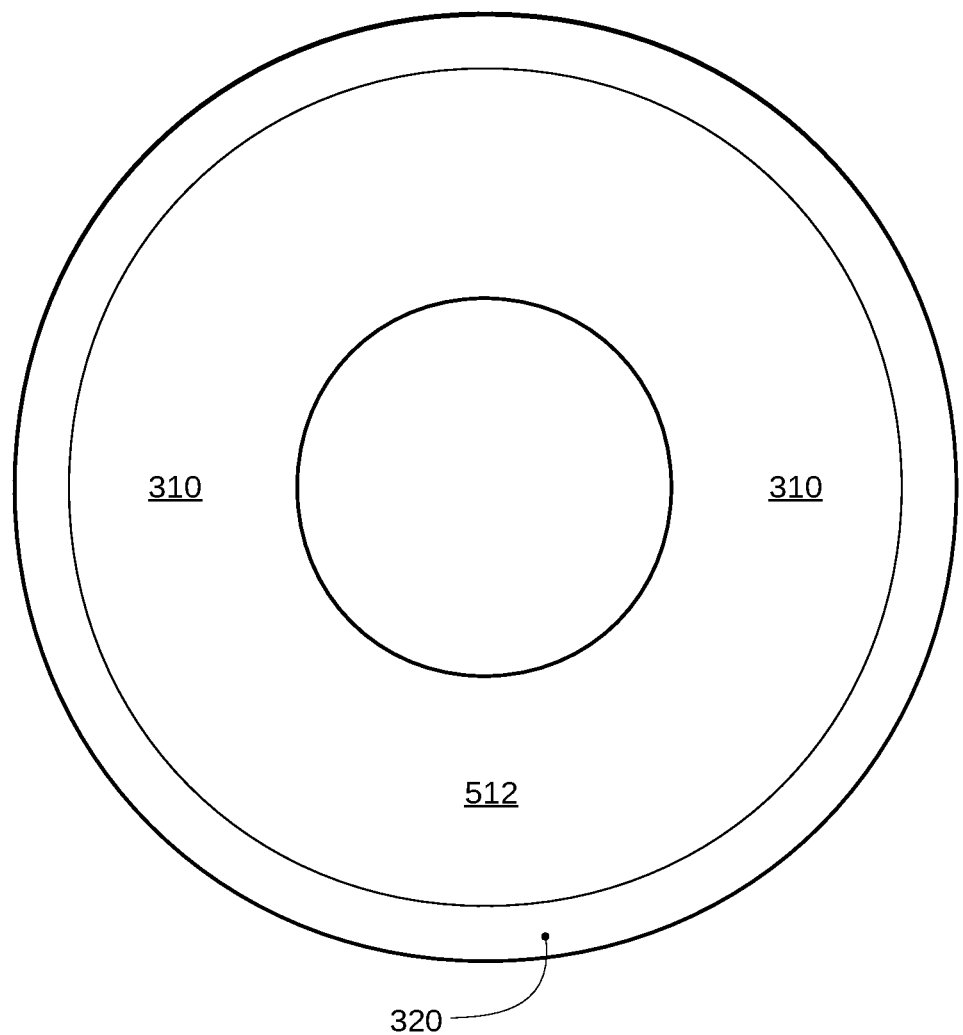

Storage and verification of data in HDD 100 is now described in conjunction with FIGS. 5A-5F, according to various embodiments. FIG. 5A schematically illustrates HDD 100 receiving a set of data 501 from a host 502 via a write command 503, according to an embodiment. Write command 503 includes set of data 501 that host 502 requests to be stored by HDD 100 on a recording surface 512 that includes SMR region 310 and media-cache region 320. Host 502 can be a host computer or operating system that is communicatively coupled to HDD 100, for example via a host interface (not shown), such as a serial advanced technology attachment (SATA) bus or a serial attached small computer system interface (SAS) bus. As shown, upon receipt of write command 503 from host 502, a copy 501A of set of data 501 is stored in RAM 134 by microprocessor-based controller 133. In the embodiment illustrated in FIGS. 5A-5F, RAM 134 is depicted as a component of microprocessor-based controller 133, but in other embodiments, RAM 134 can be implemented as a separate device from microprocessor-based controller 133.

Figure 5B:
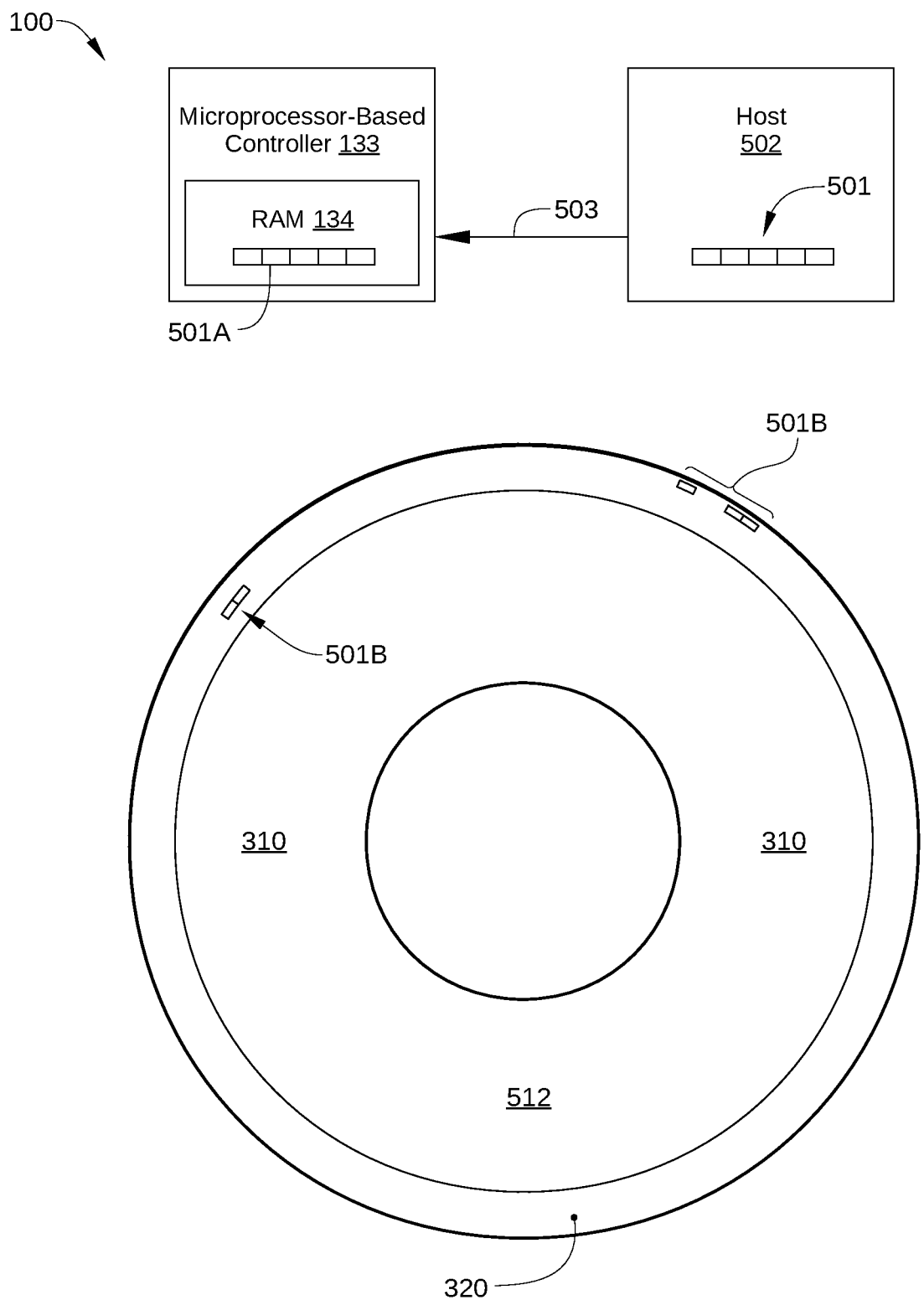
FIG. 5B schematically illustrates the hard disk drive of FIG. 1 after receiving a set of data and writing a copy of the set of data to one or more data storage tracks in a media-cache region of a recording surface, according to an embodiment.

FIG. 5B schematically illustrates HDD 100 after receiving set of data 501 and writing a copy 501B of set of data 501 to one or more data storage tracks in media-cache region 320 of recording surface 512, according to an embodiment. Generally, data stored in media-cache region 320 can be written to any suitable available sectors of media-cache region 320. For example, in the embodiment illustrated in FIG. 5B, when stored in media-cache region 320, copy 501B is distributed across multiple data storage tracks and/or to non-contiguous sectors. Alternatively, copy 501B can be written to a series of contiguous sectors and/or data storage tracks of media-cache region 320.

Figure 5C:
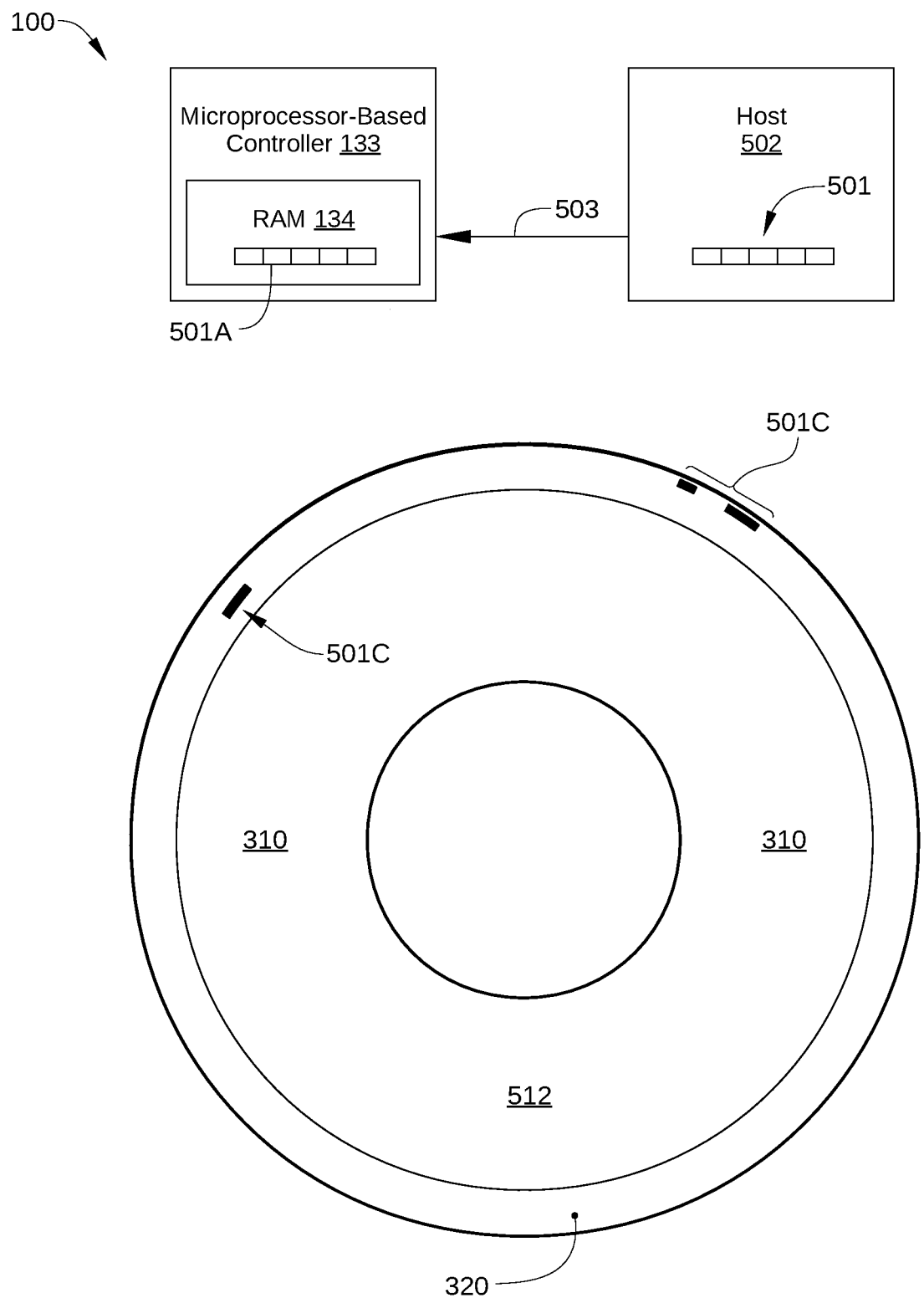
FIG. 5C schematically illustrates the hard disk drive of FIG. 1 after determining that the copy of the set of data stored in the media-cache region is a verified copy, according to an embodiment.

FIG. 5C schematically illustrates HDD 100 after determining that the copy of set of data 501 stored in media-cache region 320 is a verified copy 501C, according to an embodiment. Generally, such verification occurs immediately after copy 501B (shown in FIG. 5B) is written to the one or more data storage tracks of media-cache region 320. For example, in one such verification process, copy 501B is read and compared to copy 501A of data set 501, which is stored in RAM 134. As a result of the verification of copy of 501B, HDD 100 determines that media-cache 320 stores verified copy 501C, which is a known accurate copy of set of data 501. Verified copy 501C can be employed for subsequent verification of an unverified copy of set of data 501 that is stored in SMR region 310, such as a copy 501D, which is described below.

In the event that a portion of copy 501B is determined to be corrupted or otherwise unverifiable, that portion of copy 501B can be rewritten in media-cache region 320 and re-verified. This is because media-cache region 320 is written in a CMR format and can be selectively overwritten. Alternatively, in some embodiments, when a portion of copy 501B is determined to be corrupted or otherwise unverifiable, that portion of copy 501B can be written to a different location in media-cache region 320 and then re-verified.

Figure 5D:
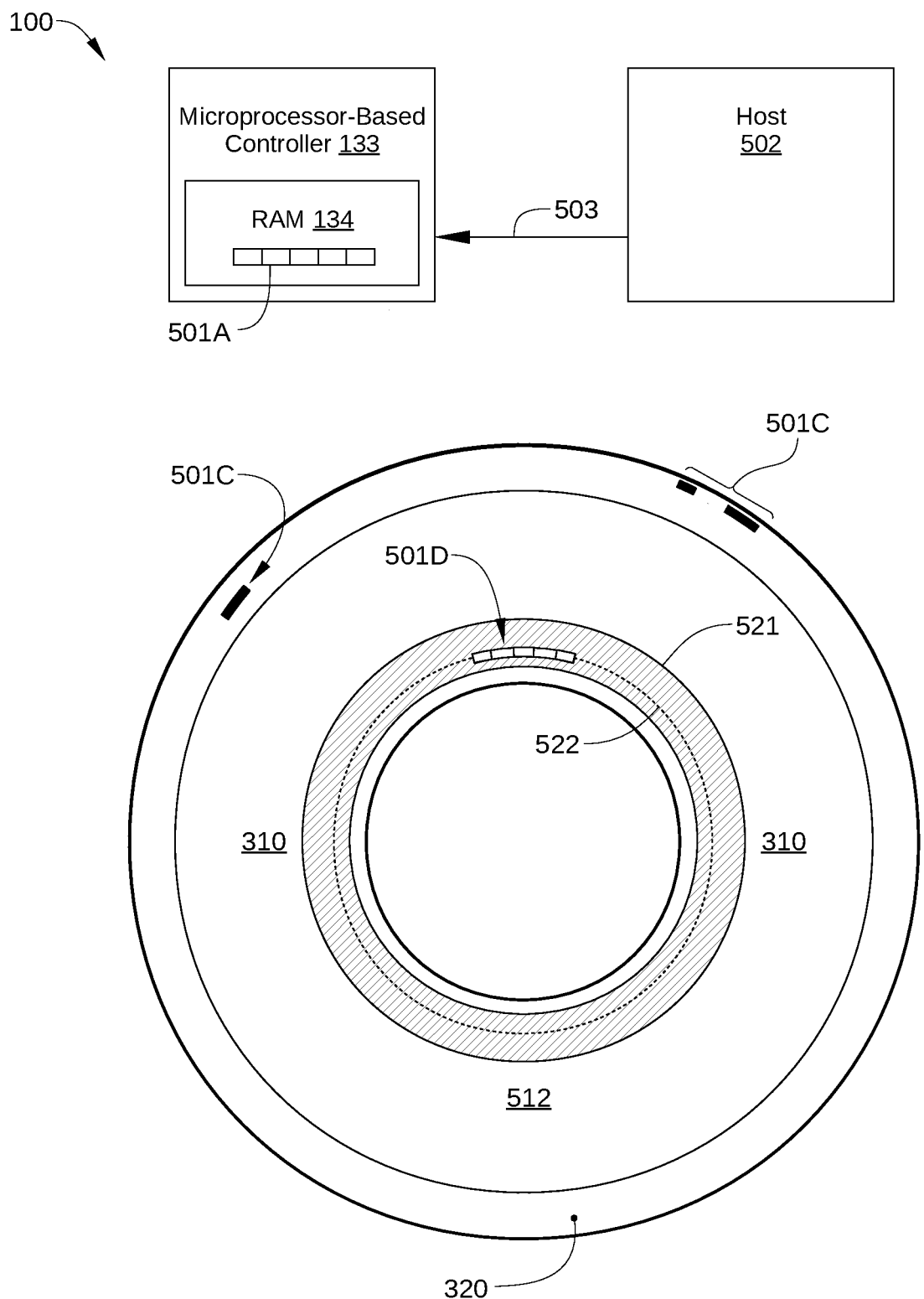
FIG. 5D schematically illustrates the hard disk drive of FIG. 1 after writing a copy of the set of data to a portion of a data storage track in an SMR region of a recording surface, according to an embodiment.

FIG. 5D schematically illustrates HDD 100 after writing a copy 501D of set of data 501 to a portion of a data storage track 522 in SMR region 310 of recording surface 512, according to an embodiment. Data storage track 522 is one of a plurality of data storage tracks (not shown) included in an SMR band 521 (cross-hatched) of SMR region 310. In the embodiment illustrated in FIG. 5D, copy 501D of set of data 501 is depicted as a quantity of data that is stored in a fraction of data storage track 522, but in other embodiments, copy 501D of set of data 501 can include a quantity of data that is stored in multiple data storage tracks. In either case, at least a portion of copy 501D is written to the most recently-written data storage track of SMR band 521 and, as such, cannot be verified until after radially adjacent sectors of an adjacent over-lapping data storage track are written and that portion of copy 501D has been partially overwritten in the radial direction. In some embodiments, a particular portion of copy 501D is not in a final state until after a predetermined number of additional sectors of SMR band 521 have been written after that particular portion of copy 501D. In some embodiments, the predetermined number of additional sectors is equal to an integral multiple of the number of sectors per SMR data track at an outer diameter of recording surface 512.

In the embodiment described above, copy 501B is stored in media-cache region 320 and verified before copy 501D is stored in SMR region 310. In other embodiments, copy 501D is first stored in SMR region 310, and copy 501B is then stored in media-cache region 320 and verified.

Figure 5E:
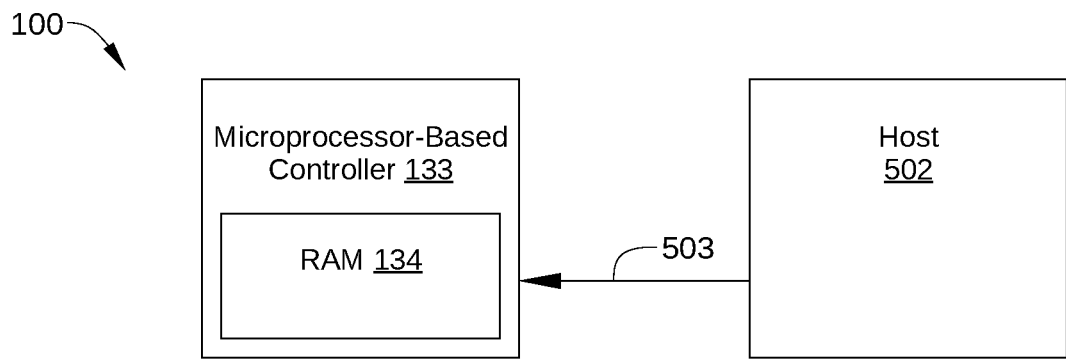
FIG. 5E schematically illustrates the hard disk drive of FIG. 1 after writing additional data to another data storage track of the SMR band, according to an embodiment.
Figure 5E:
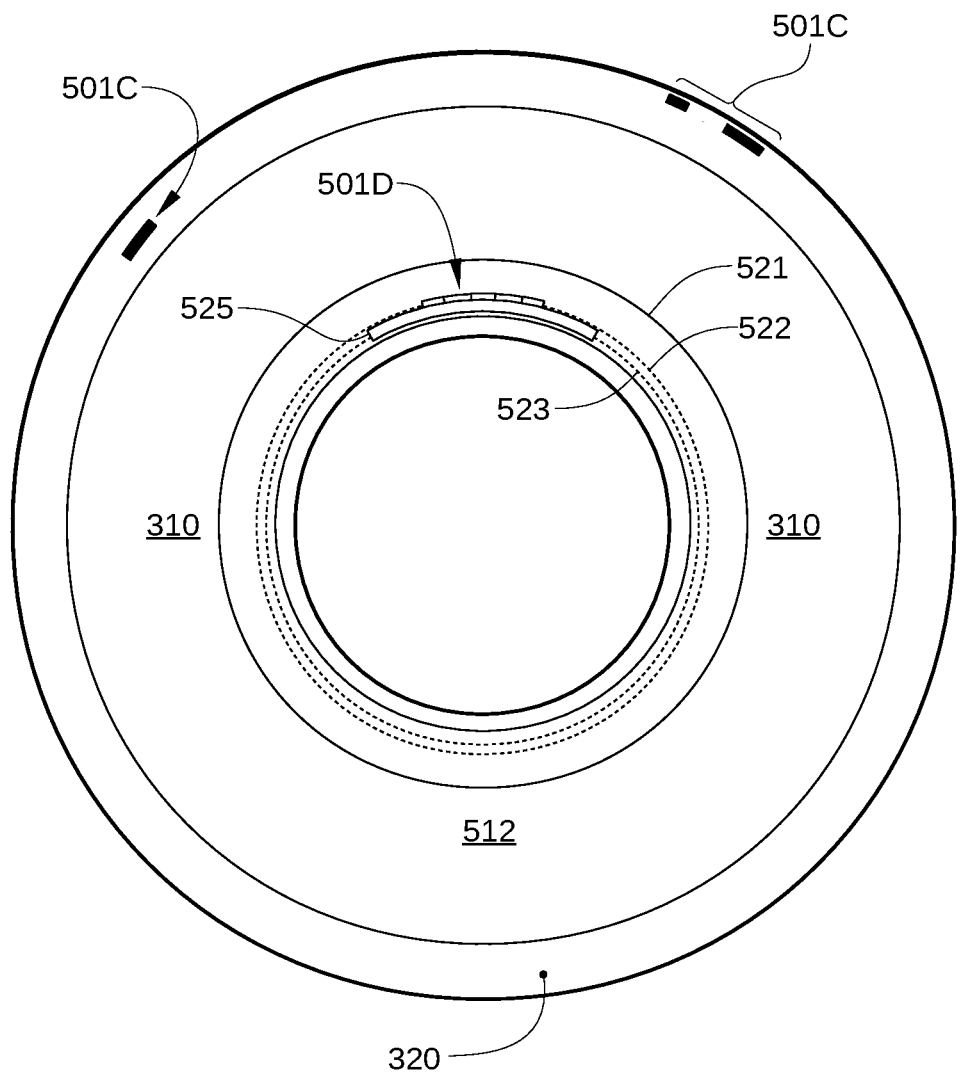

FIG. 5E schematically illustrates HDD 100 after writing additional data 525 to another data storage track 523 of SMR band 521, according to an embodiment. As shown, after writing the additional data 525 to data storage track 523, which is adjacent to data storage track 522, a portion of copy 501D is overwritten by data storage track 523 in the radial direction. As a result, the data included in copy 501D is in a final state, and is now eligible for verification. In many instances, a significant time interval occurs between the writing of copy 501D in data storage track 522 and the writing of additional data 525 in data storage track 523. As a result, copy 501A of set of data 501 is typically flushed from RAM 134 by the time that additional data 525 is written to data storage track 523 and copy 501D is eligible for verification.

Figure 5F:
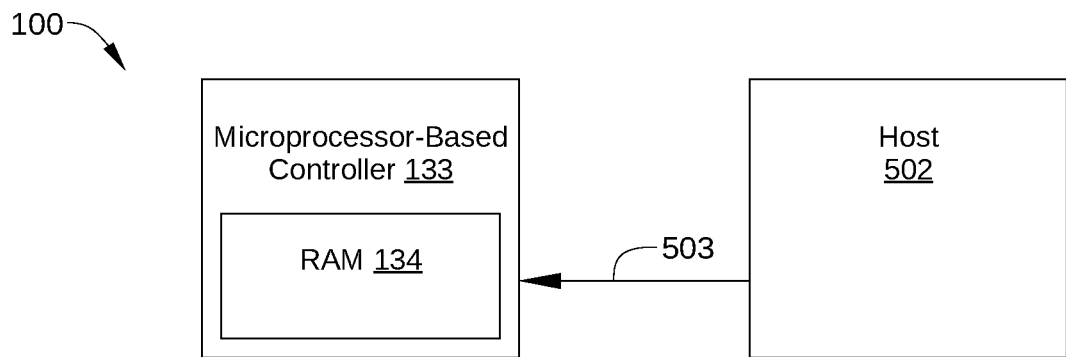
FIG. 5F schematically illustrates the hard disk drive of FIG. 1 after determining that the copy of the set of data stored in the SMR region is a verified copy of the set of data, according to an embodiment.
Figure 5F:
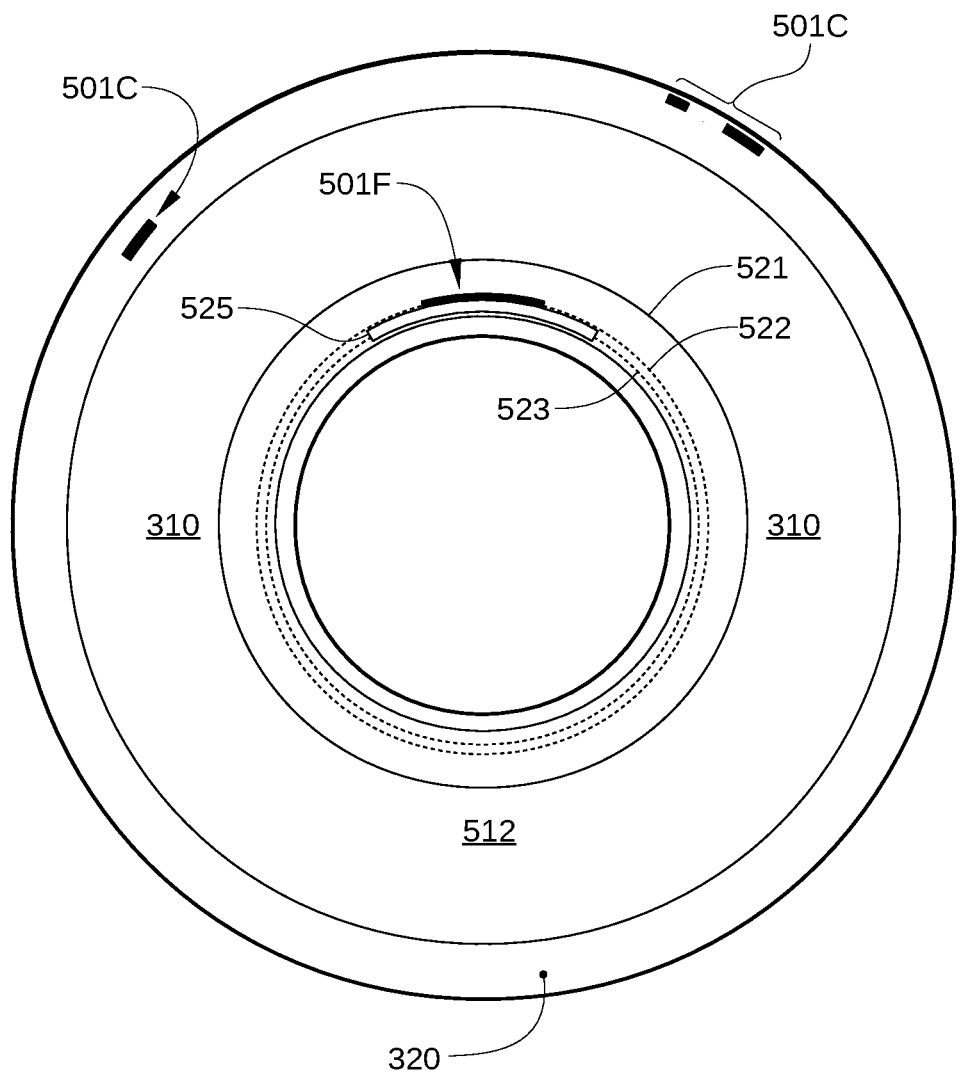

FIG. 5F schematically illustrates HDD 100 after determining that the copy of set of data 501 stored in SMR region 310 is a verified copy 501F of set of data 501, according to an embodiment. Such verification can occur at any time after additional data 525 that are written to data storage track 523 partially overwrite copy 501D (shown in FIG. 5E) in the radial direction. In one such verification process, verified copy 501C is read, copy 501D is read, and the data from each copy is compared. As a result of such a verification process, when no errors are detected in copy 501D, copy of 501D is determined to be verified copy 501F.

Storage of verification data in media-cache region 320, such as verified copy 501C, for each SMR band of SMR region 310 can utilize a significant fraction of media-cache region 320. Because media-cache region 320 is also employed to store various media-cache entries that improve the performance of HDD 100, a reduction in the size of media-cache region 320 can reduce the performance of HDD 100. According to various embodiments described herein, verification data is removed from media-cache region 320 to reduce utilization of media-cache region 320 and to improve performance of HDD 100.

Handling of Verification Data in Media Cache when an SMR Band is Finished

In some embodiments, verification data stored in media-cache region 320 is reduced when an SMR band of HDD 100 is indicated to be finished. In such embodiments, HDD 100 is configured to verify remaining unverified data in the finished SMR band. HDD 100 is further configured to remove from media-cache region 320 a copy of a set of data that is stored in the finished SMR band and is verified to have acceptable data integrity. One such embodiment is illustrated in FIGS. 6A-6C.

Figure 6A:
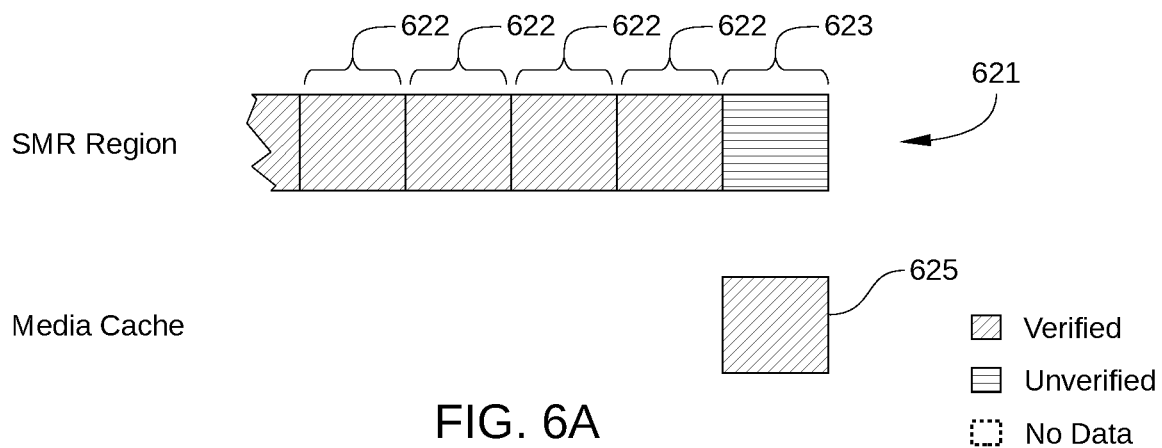
FIGS. 6A-6C schematically illustrate data stored in an SMR band and in a media-cache region of the hard disk drive of FIG. 1 when the SMR band is finished, according to an embodiment.
Figure 6B:
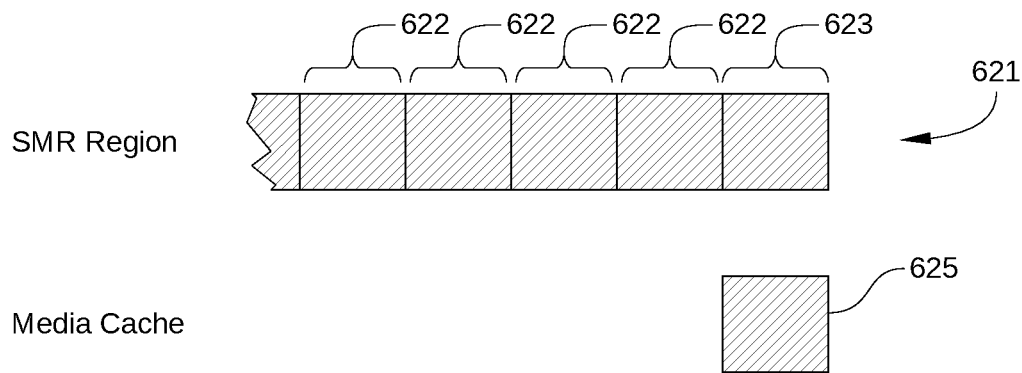
Figure 6C:
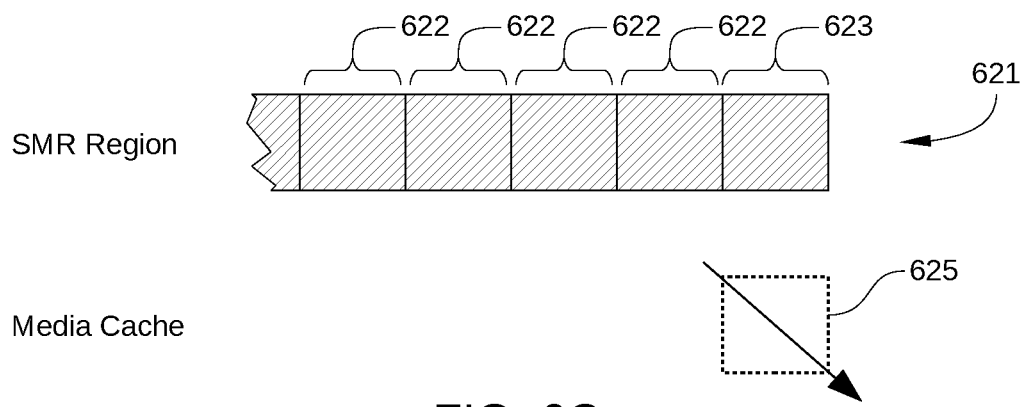

FIGS. 6A-6C schematically illustrate data stored in an SMR band 621 and in a media-cache region of HDD 100 when SMR band 621 is finished, according to an embodiment. SMR band 621 may be substantially similar to SMR band 521 in FIGS. 5A-5F, and the media-cache region may be substantially similar to media-cache region 320 in FIGS. 3 and 4. For purposes of description, the plurality of adjacent and overlapping data storage tracks 622 included in SMR band 621 are depicted schematically as a linear array of adjacent data storage regions.

FIG. 6A schematically illustrates data stored in SMR band 621 and in the media-cache region when a last data storage track 623 of SMR band 621 is written to, according to an embodiment. As shown, once last data storage track 623 is written to, SMR band 621 is finished. That is, SMR band 621 has no further capacity to store additional data from a host, since each data storage track 622 and last data storage track 623 currently store data. Alternatively, in some embodiments, SMR band 621 is considered finished before the last data storage track 623 is consumed.

In the embodiment illustrated in FIG. 6A, data stored in each of data storage tracks 622 has been verified (indicated by diagonal cross-hatching), with the exception of last data storage track 623. At the time that SMR band 621 is finished, last data storage track 623 stores unverified data (indicated by horizontal cross-hatching), and a verified copy 625 of the data written to last data storage track 623 is stored in the media-cache region.

In some embodiments, verified data is stored in SMR band 621 and/or in the media cache in response to an abnormal operating condition of HDD 100 being detected. Examples of an abnormal operating condition include an operating temperature of HDD 100 that is determined to be less than a minimum threshold value (such as a minimum normal operating temperature), an operating temperature of HDD 100 that is determined to exceed a maximum threshold value (such as a maximum normal operating temperature), detection of an acceleration exceeding a minimum threshold value (such as that caused by an impact on HDD 100), and detection of a magnitude of vibration of HDD 100 that exceeds a maximum threshold value.

In some embodiments, one or more of data storage tracks 622 may include data that does not require verification, such as data that are stored in SMR band 621 when HDD 100 is determined to be in a normal operating condition. However, in the embodiment illustrated in FIG. 6A, last data storage track 623 stores unverified data that requires verification. Hence, verified copy 625 of the data written to last data storage track 623 is stored in the media-cache region.

FIG. 6B schematically illustrates data stored in SMR band 621 and in the media-cache region of HDD 100 after the unverified data stored by last data storage track 623 is verified, according to an embodiment. Thus, in FIG. 6B, last data storage track 623 stores verified data. The verification of the unverified data stored by last data storage track 623 may be based on verified copy 625 or, if available, a copy of the data written to last data storage track 623 that is still in a data buffer of HDD 100, such as RAM 134 (shown in FIG. 1). The verification of the unverified data stored by last data storage track 623 is performed in response to the determination that SMR band 621 is finished.

FIG. 6C schematically illustrates data stored in SMR band 621 and in the media-cache region of HDD 100 after verified copy 625 is invalidated in the media-cache region, according to an embodiment. As shown, last data storage track 623 stores verified data and verified copy 625 is invalidated or otherwise removed from the media-cache region of HDD 100. Thus, when last data storage track 623 is written to and SMR band 621 is finished, remaining unverified data in SMR band 621 is verified and data stored in the media-cache region of HDD 100 that corresponds the previously unverified data are removed from the media-cache region.

In the embodiment illustrated in FIGS. 6A-6C, verified copy 625 is an accurate copy of unverified data stored in last data storage track 623, but in other embodiments, verified copy 625 can include an accurate copy of unverified data stored in one or more of data storage tracks 622.

Handling of Verification Data in Media Cache when an SMR Band is Reused

In some embodiments, verification data stored in media-cache region 320 is reduced when an SMR band of HDD 100 is indicated by a host to be reused. In such embodiments, HDD 100 is configured to discard, delete, remove, or otherwise render invalid data that are stored in a media-cache region of HDD 100 and correspond to data that are stored in the SMR band to be reused. For example, in such embodiments, the data that are stored in the media-cache region of HDD 100 and are to be invalidated may be an accurate copy of unverified data in the SMR band to be reused. One such embodiment is illustrated in FIGS. 7A and 7B.

Figure 7A:
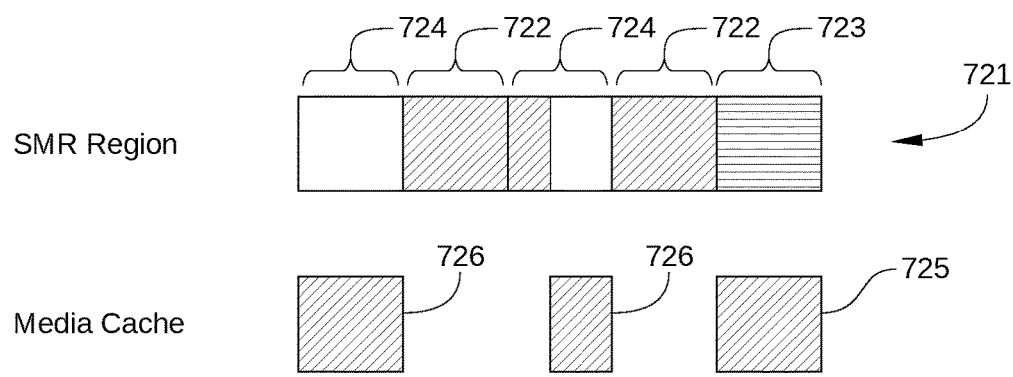
FIGS. 7A and 7B schematically illustrate data stored in an SMR band and in a media-cache region of the hard disk drive of FIG. 1 when the SMR band is indicated to be reused, according to an embodiment.
Figure 7B:
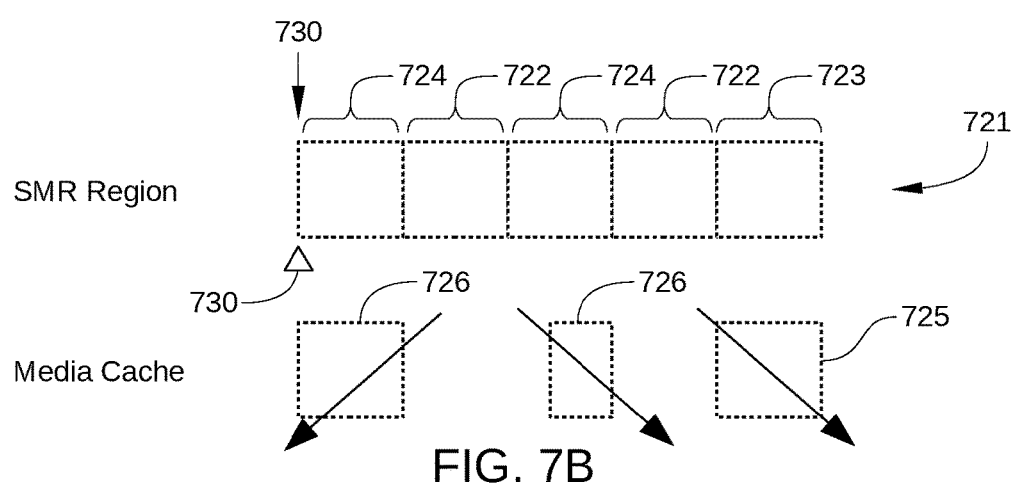

FIGS. 7A and 7B schematically illustrate data stored in an SMR band 721 and in a media-cache region of HDD 100 when SMR band 721 is indicated to be reused, according to an embodiment. SMR band 721 may be substantially similar to SMR band 521 in FIGS. 5A-5F, and the media-cache region may be substantially similar to media-cache region 320 in FIGS. 3 and 4.

FIG. 7A schematically illustrates data stored in SMR band 721 and in the media-cache region when HDD 100 receives a command from a host indicating that SMR band 721 is to be reused, according to an embodiment. As shown, data storage tracks of SMR band 721 store verified data (indicated by diagonal cross-hatching), unverified data (indicated by horizontal cross-hatching), and data that did not successfully verify (indicated by no hatching). Thus, in the embodiment illustrated in FIG. 7A, data storage tracks 722 store verified data (or other data that do not require verification), last data storage track 723 stores unverified data, and data storage track 724 stores verified and/or data that did not successfully verify. In the media-cache region, verified copies 726 are stored that each correspond to a specific set of data that did not successfully verify and are stored by data storage tracks 724. In addition, in some embodiments, a verified copy 725 is stored in the media-cache region that corresponds to the unverified data currently stored in last data storage track 723.

FIG. 7B schematically illustrates data stored in SMR band 721 and in the media-cache region of HDD 100 after HDD 100 responds to the command to reuse SMR band 721, according to an embodiment. As shown, data stored by data storage tracks 722, last data storage track 723, and data storage tracks 724 is invalidated and, as a result, data storage tracks 722, last data storage track 723, and data storage tracks 724 can store additional data from a host. For example, in some embodiments, the data stored is SMR band 721 is invalidated when a write pointer 730 is set to a starting sector 731 of SMR band 721. Further, according to the embodiments, verified copy 725 and verified copies 726 are discarded, deleted, removed from, or otherwise rendered invalid in the media-cache region. Thus, when SMR band 721 is indicated to be reused, for example by a command from a host, storage capacity of the media-cache region of HDD 100 is increased.

In the embodiment illustrated in FIGS. 7A and B, SMR band 721 is indicated to be reused at a point in time where SMR band 721 is finished and cannot store additional data from a host. In other embodiments, SMR band 721 can be indicated to be reused when SMR band 721 is not finished and has remaining capacity for storing additional data from a host.

Figure 8:
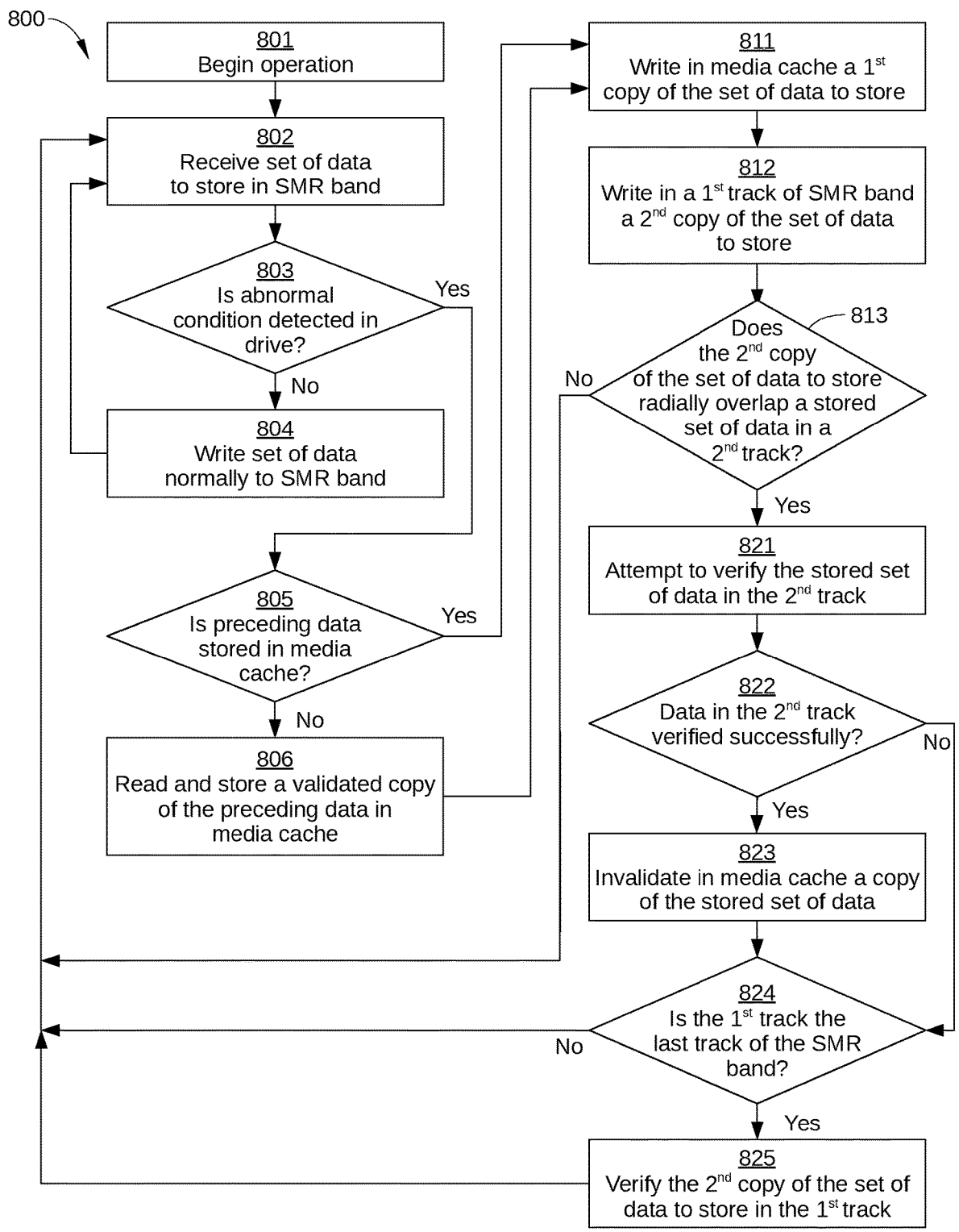
FIG. 8 sets forth a flowchart of method steps for storing data in a disk drive that includes an SMR region and a CMR region, according to an embodiment.

FIG. 8 sets forth a flowchart of method steps for storing data in a disk drive that includes an SMR region and a CMR region, according to an embodiment. Generally, the SMR region includes a plurality of data storage bands, referred to herein as "SMR bands," and the CMR region includes a media cache. The method steps may include one or more operations, functions, or actions as illustrated by one or more of blocks 801-824. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7B, persons skilled in the art will understand that the method steps may be performed with other types of systems. The control algorithms for the method steps may reside in microprocessor-based controller 133, some other controller associated with HDD 100, or a combination of both. The control algorithms can be implemented in whole or in part as software- or firmware-implemented logic, and/or as hardware-implemented logic circuits.

A method 800 begins at step 801, when a suitable controller (e.g., microprocessor-based controller 133) begins operation of HDD 100. In step 802, the controller receives a set of data 501 from a host 502 for storing in a particular SMR band of SMR region 310, such as SMR band 521. In step 803, the controller determines whether an abnormal condition is detected in HDD 100, such as an abnormal temperature or excessive vibration. If no, method 800 proceeds to step 804; if yes, method 800 proceeds to step 805. In step 804, the controller writes set of data 501 to the SMR band 521 normally. Thus, in step 804, the data stored in SMR band 521 is not verified and a copy of the data stored in SMR band 521 is not stored in media-cache region 320.

In step 805, the controller determines whether preceding data stored in SMR band 521 is also stored as a verified copy in media cache region 320. That is, the controller determines which (if any) data that have been stored prior to set of data 501 will be partially overwritten in the radial direction by some or all of set of data 501. If such data exists, the controller then determines whether there is a verified copy of such data in media cache region 320. If yes, method 800 proceeds to step 811; if no, method 800 proceeds to step 806. In step 806, the controller reads a copy of the preceding data from SMR band 521 and stores a validated copy in media cache region 320. In some embodiments, the quantity of preceding data that is stored in media cache region 320 is equal to the data stored by an integral multiple of the number of sectors per SMR data track at an outer diameter of recording surface 512. Thus, if the preceding data are damaged during the writing of set of data 501, there is still an accurate copy available of the preceding data in media cache region 320.

Step 811 is performed in response to the detection of an abnormal condition that can potentially degrade the integrity of data written to an SMR band of HDD 100. In step 811, the controller causes a first copy of the set of data 501 (e.g., verified copy 501C) to be written to media cache region 320. For example, in one such embodiment, the controller causes copy 501B (shown in FIG. 5B) to be written to media cache region 320 and then verified. In step 812, the controller causes a second copy of the set of data 501 (e.g. copy 501D in FIG. 5D) to be written to a first data storage track of the appropriate SMR band of HDD 100, such as SMR band 521. In step 813, the controller determines whether the second copy of the set of data 501 radially overlaps a previously written set of data stored in a second data storage track of SMR band 521. It is noted that a copy of such previously written data is stored in media cache region 320, for example in step 806, and includes at least a quantity of data equal to the data stored by an integral multiple of the number of sectors per SMR data track at an outer diameter of recording surface 512. If no, method 800 returns to step 802; if yes, method 800 proceeds to step 821.

In step 821, the controller attempts to verify the set of data stored in the second data storage track of SMR band 521 that was radially overlapped by the writing of copy 501D to the first data storage track of SMR band 521. The verification of the set of data stored in the second data storage track of SMR band 521 is typically performed, for example, based on an error correction process. In step 822, the controller determines whether verification is successfully completed in step 821. If yes, method 800 proceeds to step 823; if no, method 800 proceeds to step 824. Thus, in instances in which at least a portion of the set of data stored in the second data storage track of SMR band 521 cannot be verified, a corresponding portion of the verified copy of the set of data stored in the second data storage track of SMR band 521 is retained in media-cache region 320, since there is no other accurate copy of such data in HDD 100. Thus, in such instances, not all of the verified copy of the set of data stored in the second data storage track of SMR band 521 is invalidated in media-cache region 320.

In step 823, i.e. in instances in which the verification of step 821 is completed successfully, the controller invalidates in media-cache region 320 the verified copy of the set of data stored in the second data storage track of SMR band 521 that was validated in step 821. In step 824, the controller determines whether the first data storage track of SMR band 521 (to which the set of data 501 is written in step 812) is the last data storage track of SMR band 521. If no, method 800 returns to step 802 and an additional set of data is received for storage in HDD 100; if yes, method 800 proceeds to step 825. In step 825, the controller verifies the second copy of the set of data 501 (e.g. copy 501D) that is written to the first data storage track of SMR band 521 in step 812. Because the data storage track storing copy 501D is determined to be the last data storage track of SMR band 521, copy 501D will not be partially overwritten in the radial direction by a subsequently written data storage track of SMR band 521. Thus, copy 501D can be validated, for example, as shown in FIG. 6C.

Reducing Media Cache when an SMR Band is Closed

In some embodiments, verification data stored in media-cache region 320 is reduced when an SMR band of HDD 100 is closed, for example by a command from a host. In such embodiments, HDD 100 is configured to verify unverified data in the SMR band to be closed. HDD 100 is further configured to discard, delete, remove, or otherwise render invalid data that are stored in a media-cache region of HDD 100 that corresponds to verified data in the SMR band to be closed. In some embodiments, HDD 100 is further configured to, upon reopening of the closed SMR band, read the most recently-written data from the SMR band and store a verified copy thereof in the media-cache region until the most recently-written data have an overlapping data storage track written thereon and are then verified. One such embodiment is illustrated in FIGS. 9A-9E.

FIGS. 9A-9E schematically illustrate data stored in an SMR band 921 and in a media-cache region of HDD 100 when SMR band 921 is indicated to be closed, according to an embodiment. SMR band 921 may be substantially similar to SMR band 521 in FIGS. 5A-5F, and the media-cache region may be substantially similar to media-cache region 320 in FIGS. 3 and 4.

Figure 9A:
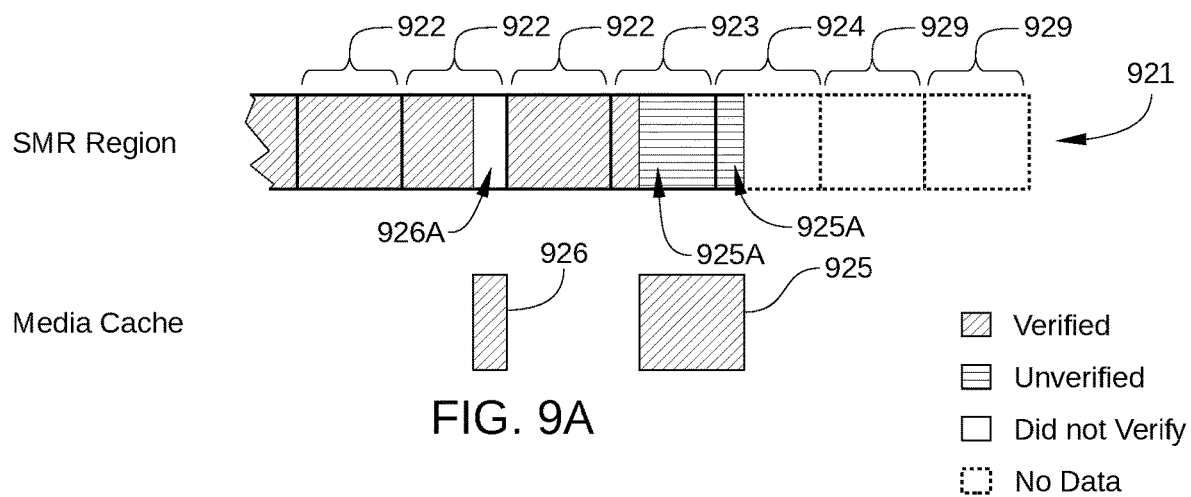
FIG. 9A schematically illustrates data stored in an SMR band and in a media-cache region when the hard disk drive of FIG. 1 receives a command from a host indicating that the SMR band is to be closed, according to an embodiment.

FIG. 9A schematically illustrates data stored in SMR band 921 and in the media-cache region when HDD 100 receives a command from a host indicating that SMR band 921 is to be closed, according to an embodiment. As shown, when HDD 100 receives the "close" command, data storage tracks of SMR band 921 store verified data (indicated by diagonal cross-hatching), unverified data (indicated by horizontal cross-hatching), data that did not successfully verify (indicated by no cross-hatching), and/or no data (indicated by broken lines and no hatching). Thus, in the embodiment illustrated in FIG. 9A, data storage tracks 922 store verified data (or other data that do not require verification) and/or data that did not successfully verify 926A, data storage track 923 stores a combination of verified data (or other data that do not require verification) and unverified data (data that do require verification), data storage track 924 stores unverified data (that do require verification), and remaining data storage tracks 929 store no data. In addition, a verified copy 925 and a verified copy 926 are stored in the media-cache region. Verified copy 925 is an accurate copy of unverified data 925A currently stored in data storage tracks 923 and 924, and verified copy 926 is an accurate copy of a specific set of data that did not successfully verify 926A stored by one of data storage tracks 922.

It is noted that in some embodiments, the minimum quantity of unverified data 925A stored by data storage tracks 923 and 924 is substantially equivalent to a quantity of data stored by a single data storage track of SMR band 921. This is because, at any given time, there is generally the equivalent of such a quantity of data in SMR band 921 that has not been partially overwritten in the radial direction by an adjacent data storage track. As described above, unverified data 925A are advantageously verified after being partially overwritten by an adjacent data storage track.

Figure 9B:
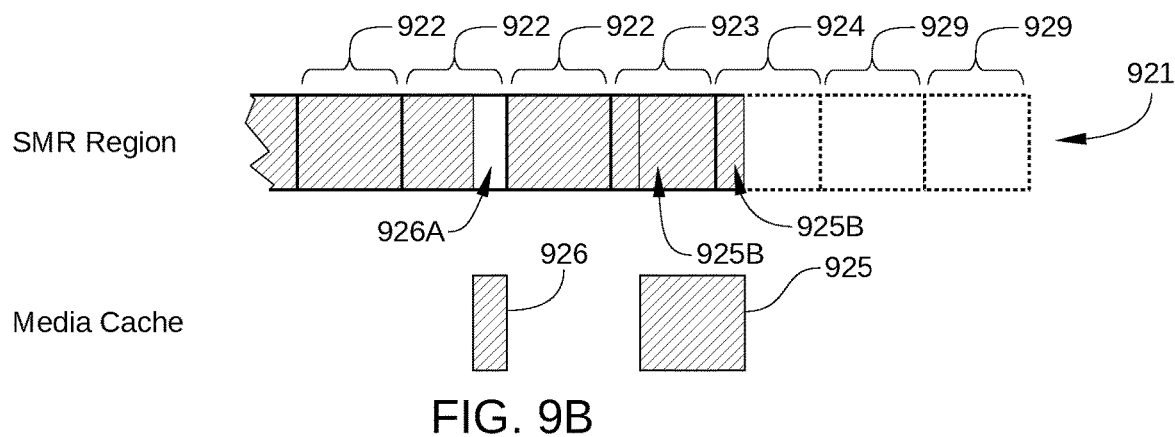
FIG. 9B schematically illustrates data stored in the SMR band and in the media-cache region of FIG. 9A after the hard disk drive of FIG. 1 responds to the command to close the SMR band, according to an embodiment.

FIG. 9B schematically illustrates data stored in SMR band 921 and in the media-cache region of HDD 100 after HDD 100 responds to the command to close SMR band 921, according to an embodiment. As shown, in response to the command to close SMR band 921, the unverified data stored by data storage tracks 923 and 924 (i.e., unverified data 925A in FIG. 9A) are verified and, in some embodiments, re-written if necessary. For example, in the embodiment illustrated in FIG. 9B, the unverified data stored by data storage tracks 923 and 924 are read, and, if read without error (for example based on an error correction process), are determined to be a verified copy 925B of verified copy 925. In the instance illustrated in FIG. 9B, the unverified data stored by data storage tracks 923 and 924 are determined to be accurate and/or to have sufficient integrity. In some embodiments, when some or all sectors of unverified data 925A are determined to be corrupted, unreadable, or otherwise unverifiable, such sectors are rewritten and re-verified or a copy thereof is retained in the media cache region. In some embodiments, the verification of data storage tracks 923 and 924 is based on an error correction process, and in alternative embodiments on a comparison of the unverified data stored by data storage tracks 923 and 924 to verified copy 925. When some or all sectors of unverified data 925A are determined to be corrupted, unreadable, or otherwise unverifiable, such sectors can be rewritten because the data that are stored by data storage tracks 923 and 924 and did not successfully verify have not yet been partially overwritten by an adjacent data storage track in the radial direction. Thus, the sectors of data storage tracks 923 and 924 that cannot be verified can be selectively rewritten without damaging data stored in adjacent data storage tracks of SMR band 921. In some embodiments, data written to one or more of data storage tracks 922 can be potentially damaged by the rewriting of unverified data 925A. In such embodiments, data stored by one or more of data storage tracks 922 is read prior to the rewriting of unverified data 925A. Alternatively, when some or all sectors of unverified data 925A are determined to be corrupted, unreadable, or otherwise unverifiable, verified copy 925 is retained in the media cache region when SMR band 921 is closed, and unverified data 926A are not rewritten.

Figure 9C:
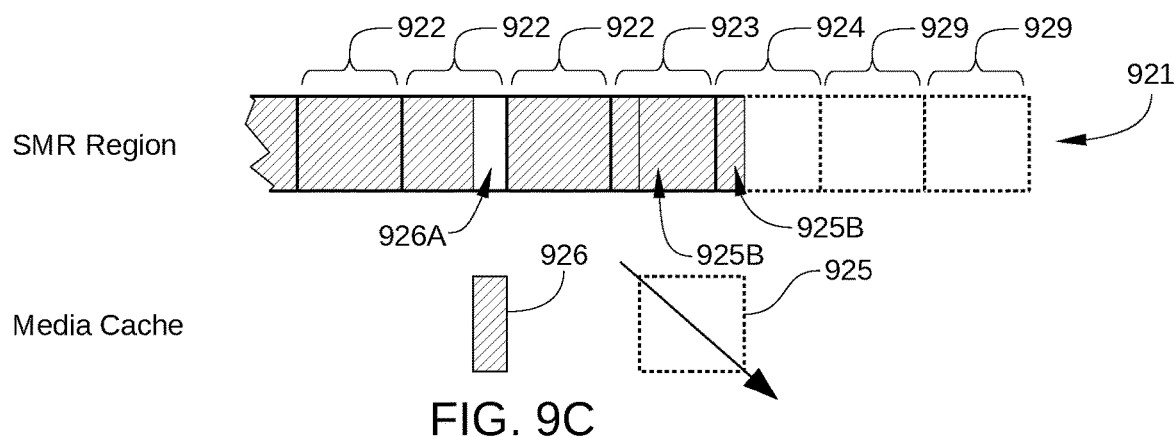
FIG. 9C schematically illustrates data stored in the SMR band and in the media-cache region of FIG. 9A after the hard disk drive of FIG. 1 continues to respond to the command to close the SMR band, according to an embodiment.

FIG. 9C schematically illustrates data stored in SMR band 921 and in the media-cache region of HDD 100 after HDD 100 continues to respond to the command to close SMR band 921, according to an embodiment. As shown, HDD 100 discards, deletes, removes, or otherwise renders invalid verified copy 925 that is stored in the media-cache region of HDD 100. As noted above, verified copy 925 is removed or otherwise rendered invalid in the media-cache region when unverified data 925A are determined to be a verified copy 925B of verified copy 925 (but not when unverified data 925A are determined to be corrupted, unreadable, or otherwise unverifiable). Thus, while SMR band 921 remains closed, which can be for an indeterminate time interval, storage capacity of the media-cache region of HDD 100 is not reduced by storing verified copy 925. It is noted that verified copy 926 remains stored in the media-cache region of HDD 100, since verified copy 926 corresponds to a specific set of data that did not successfully verify 926A stored by one of data storage tracks 922, and therefore is the only accurate copy of such data in HDD 100.

Figure 9D:
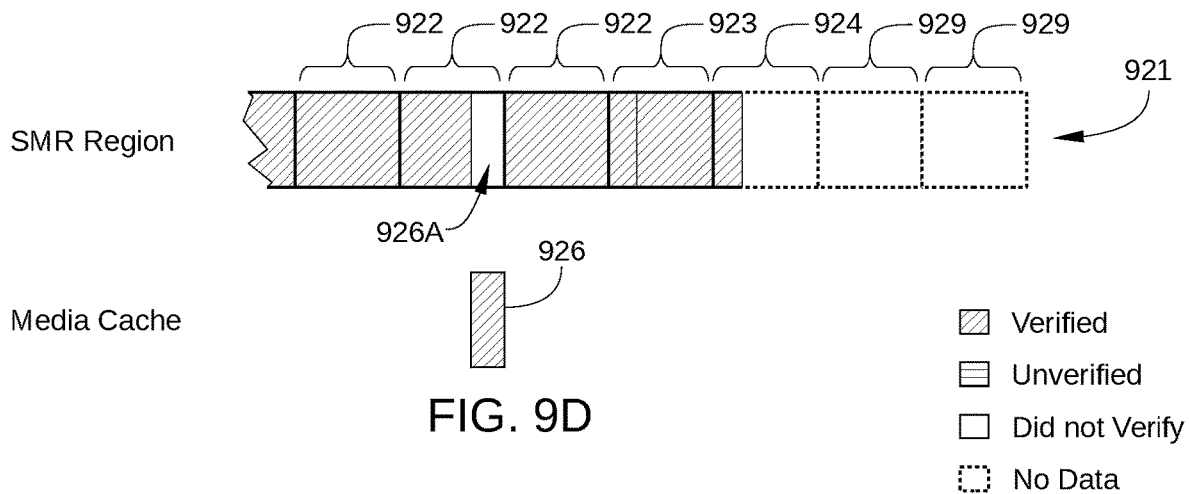
FIG. 9D schematically illustrates data stored in the SMR band and in the media-cache region of FIG. 9A after the hard disk drive of FIG. 1 receives a command from a host indicating that the SMR band is to be reopened, according to an embodiment.

FIG. 9D schematically illustrates data stored in SMR band 921 and in the media-cache region of HDD 100 when HDD 100 receives a command from a host indicating that SMR band 921 is to be reopened, according to an embodiment. Alternatively, in some embodiments, the command received from the host can be a write command that is received when SMR band 921 is closed. As shown, when the command to reopen SMR band 921 is received by HDD 100, there is no unverified data stored in SMR band 921. Instead, only verified data (or other data that do not require verification) or unverifiable data 926A are stored in SMR band 921. As a result, there is not a verified copy of data stored in the media-cache region of HDD 100 that corresponds to unverified data stored in SMR band 921. Instead, the verified copies of data that are associated with SMR band 921 and are stored in the media-cache region of HDD 100 are accurate copies of unverifiable data 926A stored by one of data storage tracks 922. For example, in the embodiment illustrated in FIG. 9D, verified copy 926 is stored in the media-cache region of HDD 100.

Figure 9E:
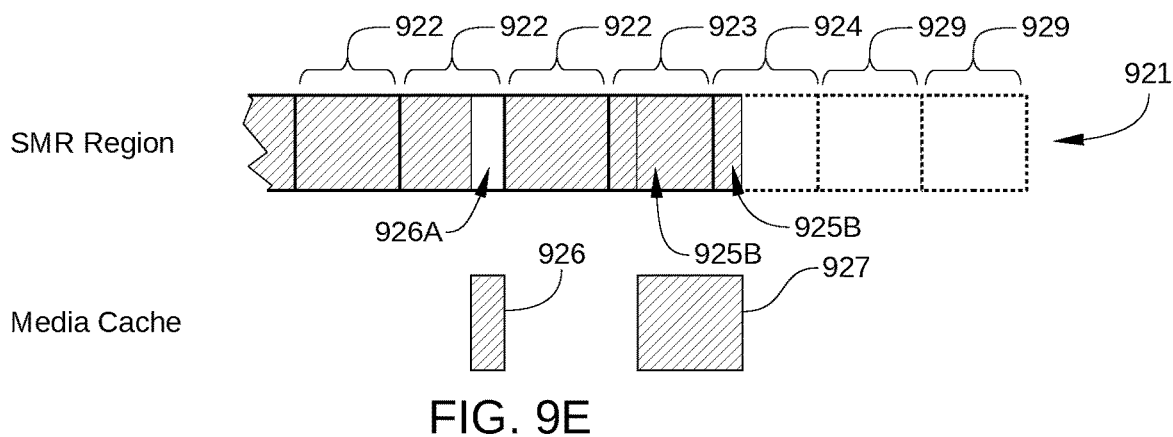
FIG. 9E schematically illustrates data stored in the SMR band and in the media-cache region of FIG. 9A after the hard disk drive of FIG. 1 responds to the command to reopen the SMR band, according to an embodiment.

FIG. 9E schematically illustrates data stored in SMR band 921 and in the media-cache region of HDD 100 when HDD 100 responds to the command to reopen (or to continue writing to) SMR band 921, according to an embodiment. As shown, HDD 100 responds to the command to reopen SMR band 921 by reading certain data stored by data storage tracks 923 and 924 and storing a verified copy 927 of such data in the media-cache region of HDD 100. Specifically, verified copy 927 is an accurate copy of verified copy 925B, which is stored in SMR band 921. Thus, when data stored in data storage tracks 923 and 924 are subsequently partially overwritten in the radial direction by an adjacent data storage track, such data are not lost even when such data are determined to be unverifiable after being partially overwritten.

Figure 9F:
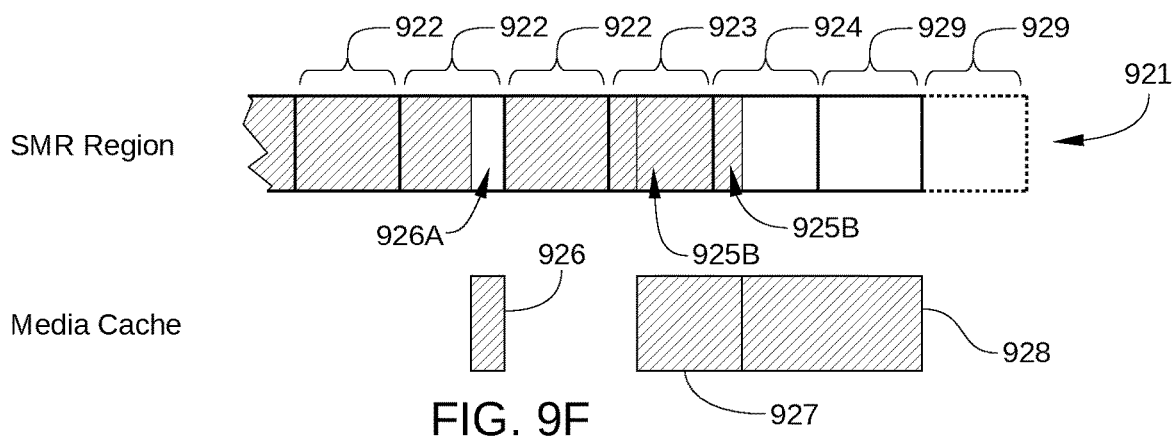
FIG. 9F schematically illustrates data stored in the SMR band and in the media-cache region of FIG. 9A after the hard disk drive of FIG. 1 continues to store data in the SMR band after reopening the SMR band, according to an embodiment.

FIG. 9F schematically illustrates data stored in SMR band 921 and in the media-cache region of HDD 100 when HDD 100 continues to store data in SMR band 921 after reopening SMR band 921, according to an embodiment. In FIG. 9F, one or more abnormal conditions are detected. As a result, data written to SMR band 921 are preferably verified. To that end, verified copy 928 of additional data to be stored in SMR band 921 is written to the media cache region and is verified. Verified copy 925B remains stored in data storage tracks 923 and 924 as shown, and remaining data storage tracks 929 store no data.

Figure 9G:
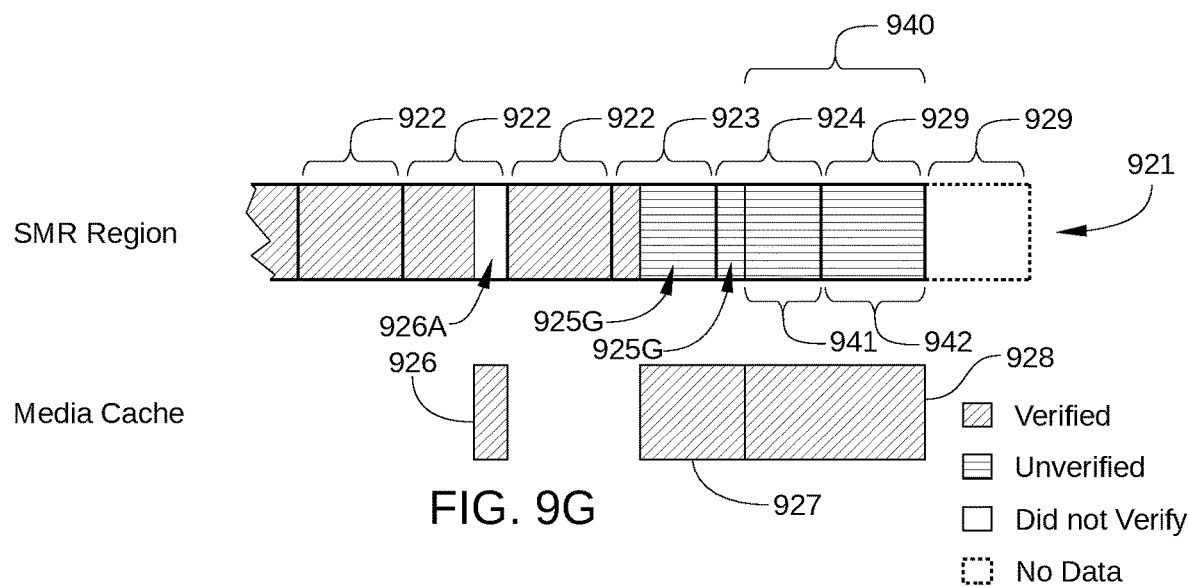
FIG. 9G schematically illustrates data stored in the SMR band and in the media-cache region of FIG. 9A when the hard disk drive of FIG. 1 continues to store data in the SMR band after reopening the band, according to an embodiment.

FIG. 9G schematically illustrates data stored in SMR band 921 and in the media-cache region of HDD 100 when HDD 100 continues to store data in SMR band 921 after reopening SMR band 921, according to an embodiment. In FIG. 9G, additional data 940 is written to a remaining portion of data storage track 924 and to one or more of remaining data storage tracks 929. In the instance illustrated in FIG. 9G, a first portion 941 of additional data 940 is written to data storage track 924 and a second portion 942 of additional data 940 is written to one of remaining data storage tracks 929 as shown. The writing of additional data 940 to data storage track 924 and remaining data storage track 929 partially overwrites in the radial direction data currently stored in data storage tracks 923 and 924 (i.e., verified copy 925B in FIG. 9F). As a result, the integrity of verified copy 925B may be degraded, and verified copy 925B becomes unverified copy 925G.

Figure 9H:
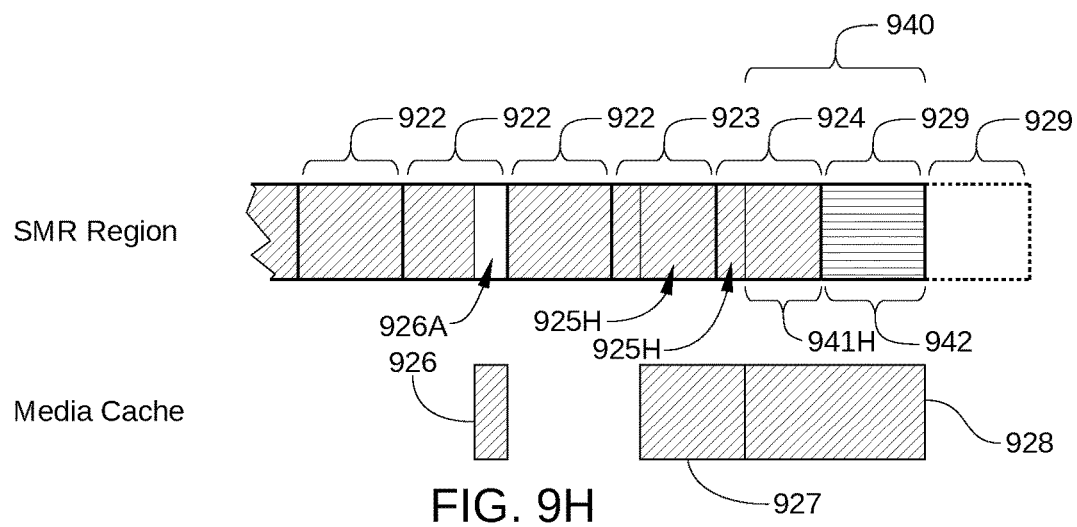
FIG. 9H schematically illustrates data stored in the SMR band and in the media-cache region of FIG. 9A while the hard disk drive of FIG. 1 continues to store data in the SMR band after reopening the band, according to an embodiment.

FIG. 9H schematically illustrates data stored in SMR band 921 and in the media-cache region of HDD 100 while HDD 100 continues to store data in SMR band 921 after reopening SMR band 921, according to an embodiment. In FIG. 9H, sectors of data storage tracks 923 and 924 and remaining data storage track 929 that are eligible for verification are verified. That is, the sectors of SMR band 921 that are in a final state and have been partially overwritten in the radial direction by a subsequently written sector of an adjacent data storage track are verified. In the instance illustrated in FIG. 9H, unverified copy 925G (shown in FIG. 9G) stored in data storage tracks 923 and 924 becomes verified copy 925H and first portion 941 of additional data 940 (shown in FIG. 9G) stored in remaining data storage track 929 becomes verified copy 941H.

Figure 9I:
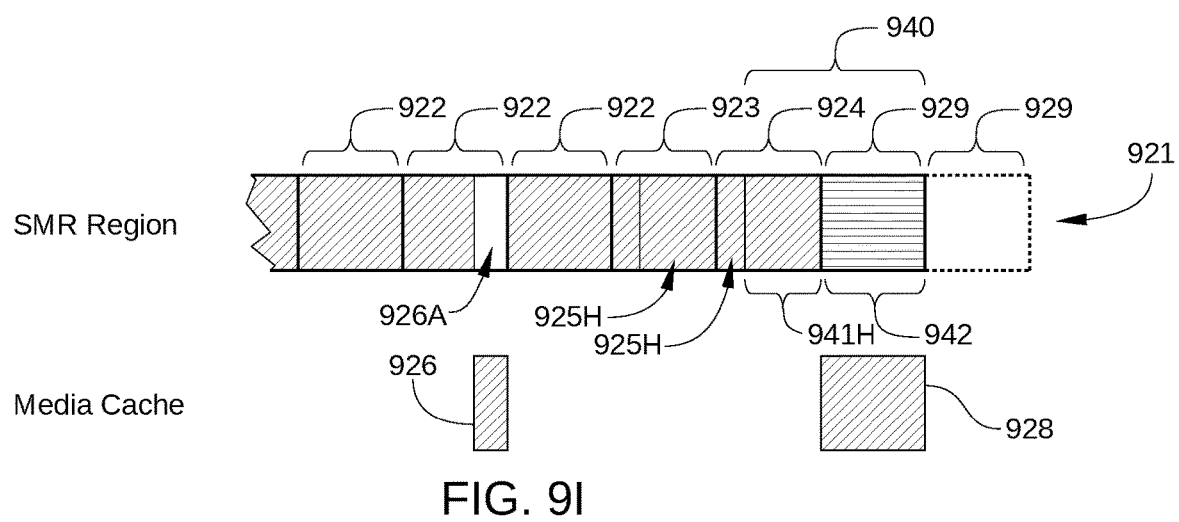
FIG. 9I schematically illustrates data stored in the SMR band and in the media-cache region of FIG. 9A while the hard disk drive of FIG. 1 continues to store data in the SMR band after reopening the band, according to an embodiment.

FIG. 9I schematically illustrates data stored in SMR band 921 and in the media-cache region of HDD 100 while HDD 100 continues to store data in SMR band 921 after reopening SMR band 921, according to an embodiment. In FIG. 9I, certain verified data stored in the media cache region are discarded, deleted, removed from, or otherwise rendered invalid in the media-cache region. Specifically, verified data stored in the media cache region that correspond to verified copy 925H and verified copy 941H are discarded, deleted, removed from, or otherwise rendered invalid in the media-cache region. By contrast, the portion of verified copy 928 that corresponds to second portion 942 of additional data 940 remains in the media cache region as the known accurate copy of second portion 942. The portion of verified copy 928 that corresponds to second portion 942 is retained in the media-cache region of HDD 100 until second portion 942 of additional data 940 is verified in remaining data storage tracks 929. In such embodiments, HDD 100 is configured to discard, delete, remove, or otherwise render invalid verified copy 928 after second portion is verified.

Figure 10:
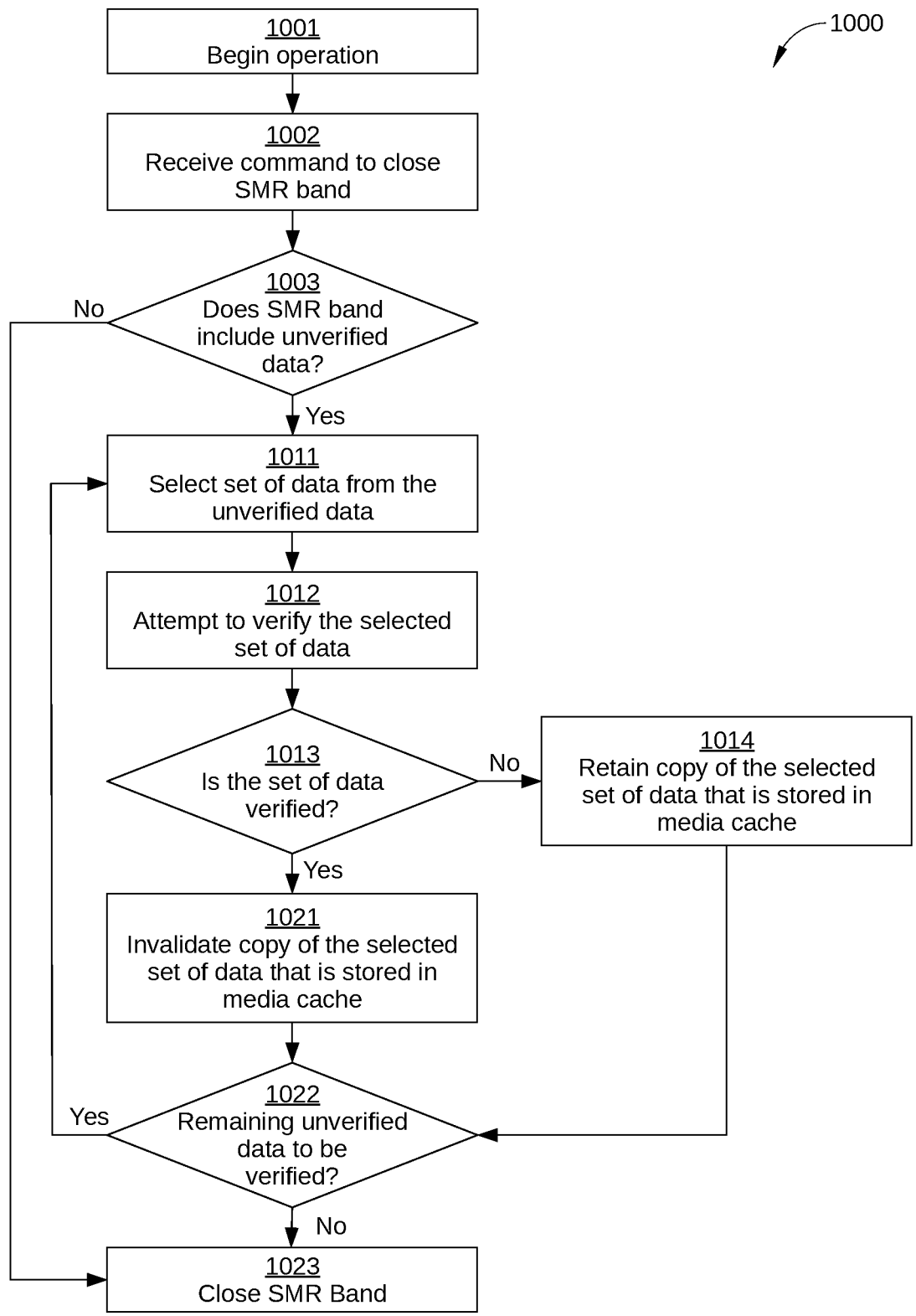
FIG. 10 sets forth a flowchart of method steps for storing data in a disk drive when an SMR band of the drive is closed, according to an embodiment.

FIG. 10 sets forth a flowchart of method steps for storing data in a disk drive when an SMR band of the drive is closed, according to an embodiment. The method steps may include one or more operations, functions, or actions as illustrated by one or more of blocks 1001-1023. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7B, persons skilled in the art will understand that the method steps may be performed with other types of systems. The control algorithms for the method steps may reside in microprocessor-based controller 133, some other controller associated with HDD 100, or a combination of both. The control algorithms can be implemented in whole or in part as software- or firmware-implemented logic, and/or as hardware-implemented logic circuits.

A method 1000 begins at step 1001, when a suitable controller (e.g., microprocessor-based controller 133) begins operation of HDD 100. In step 1002, the controller receives a command to close a particular SMR band in SMR region 310 of HDD 100. For example, in some embodiments, to conserve memory resources of HDD 100 that are employed in maintaining open SMR bands, a host indicates to HDD 100 that certain SMR bands are less likely to be accessed in the near future and can be closed. In other embodiments, HDD 100 is configured to determine when certain SMR bands are less likely to be accessed in the near future and closes such SMR bands. In step 1003, the controller determines whether the SMR band to be closed includes unverified data. If no, method 1000 proceeds to step 1023 and closes the SMR band; if yes, method 1000 proceeds to step 1011.

In step 1011, the controller selects a set of data from the unverified data included in the SMR band. In some embodiments, the set of data includes one or more sectors of unverified data, in other embodiments, the set of data includes a complete data storage track of unverified data, and in other embodiments, the set of data includes multiple data storage tracks of unverified data. In step 1012, the controller attempts to verify the selected set of data, for example by comparing to a known accurate copy of the unverified data. In step 1013, the controller determines whether the selected set of data can be verified. If yes, method 1000 proceeds to step 1021; if no, method 1000 proceeds to step 1014.

In step 1014, which is performed in response to the selected set of data not being verifiable, the controller retains an accurate copy of the selected set of data in media cache region 310. In step 1021, which is performed in response to the selected set of data being verified, the controller invalidates the verified copy of the selected set of data in media cache region 310. Thus, while the SMR band remains closed, the capacity of media cache region 310 is not reduced by storing the verified copy. In step 1022, the controller determines whether there are any remaining unverified data in the SMR band to be verified. If yes, method 1000 returns to step 1011 and another set of data from the unverified data is selected; if no, method 1000 proceeds to step 1023. In step 1023, the controller closes the SMR band indicated in the command received in step 1002.

Figure 11:
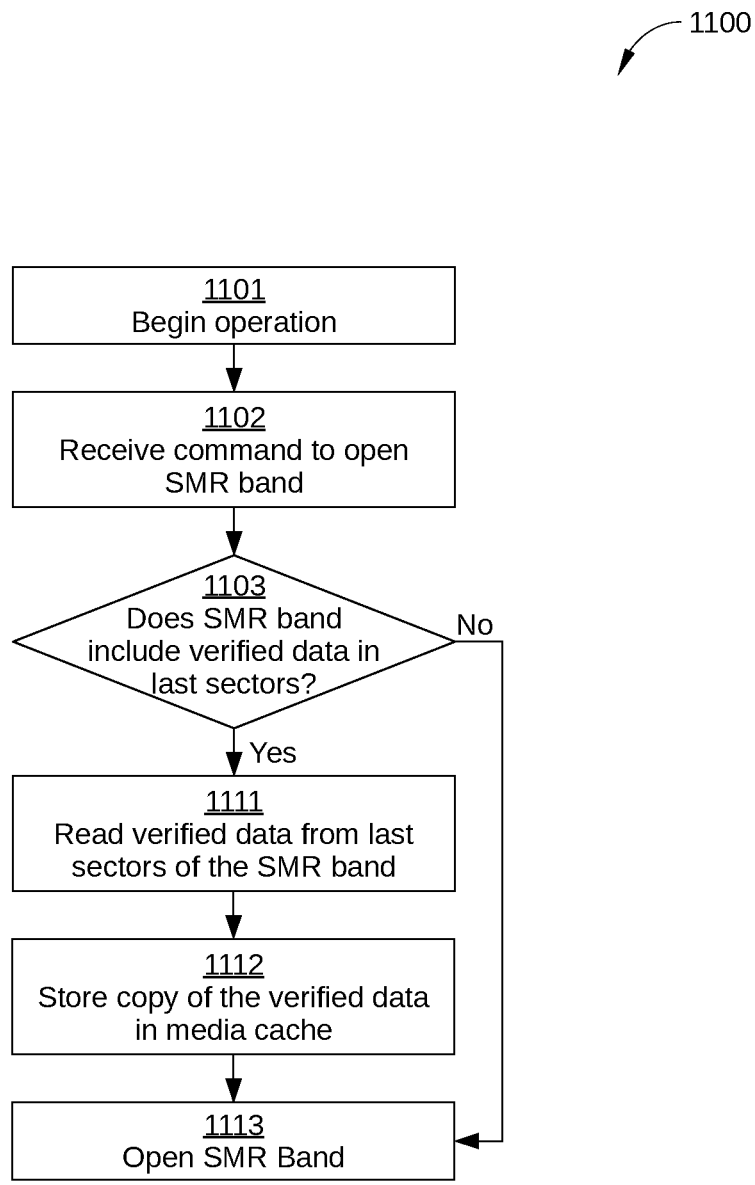
FIG. 11 sets forth a flowchart of method steps for storing data in a disk drive when an SMR band of the drive is opened, according to an embodiment.

FIG. 11 sets forth a flowchart of method steps for storing data in a disk drive when an SMR band of the drive is opened, according to an embodiment. The method steps may include one or more operations, functions, or actions as illustrated by one or more of blocks 1101-1116. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7B, persons skilled in the art will understand that the method steps may be performed with other types of systems. The control algorithms for the method steps may reside in microprocessor-based controller 133, some other controller associated with HDD 100, or a combination of both. The control algorithms can be implemented in whole or in part as software- or firmware-implemented logic, and/or as hardware-implemented logic circuits.

A method 1100 begins at step 1101, when a suitable controller (e.g., microprocessor-based controller 133) begins operation of HDD 100. In step 1102, the controller receives a write command or a command to open a particular SMR band in SMR region 310 of HDD 100. In step 1103, the controller determines whether the SMR band to be opened includes verified data in the sectors that are the most recently written to sectors. For example, in some embodiments, metadata associated with the particular SMR band indicates whether data stored in the most recently written-to sectors required verification. If no, method 1100 proceeds to step 1113; if yes, method 1100 proceeds to step 1111. In some embodiments, the most recently written-to sectors include an integral multiple of the number of sectors per SMR data track at an outer diameter of a recording surface of HDD 100.

In step 1111, the controller reads the verified data from the sectors of the SMR band to have data written thereto prior to being closed. In some embodiments, the number of sectors from which the controller reads the verified data equals an integral multiple of the number of sectors per SMR data track at an outer diameter of a recording surface of HDD 100. In step 1112, the controller stores in media-cache region 310 a copy of the verified data read from the last data storage track of the SMR band. In step 1113, the controller opens the SMR band for storing data from the host, for example via method 800 of FIG. 8. Thus, upon receipt of a write command from a host, method 800 can be implemented with respect to the now opened SMR band.

Reducing Media Cache when Data are Written to a Last Track of an SMR Band

In some embodiments, verification data stored in media-cache region 320 is reduced when a last data storage track of an SMR band of HDD 100 has data stored therein while an abnormal operating condition of HDD 100 is detected. In such embodiments, HDD 100 is configured to determine that data are being stored in the last data storage track of the SMR band and, in response, verify that data in the SMR band without storing a verified copy of such data in the media-cache region of HDD 100. One such embodiment is illustrated in FIGS. 12A-12D.

FIGS. 12A-12D schematically illustrate data stored in an SMR band 1221 and in a media-cache region of HDD 100 when data are written to a last data storage track 1224 of an SMR band 1221, according to an embodiment. SMR band 1221 may be substantially similar to SMR band 521 in FIGS. 5A-5F, and the media-cache region may be substantially similar to media-cache region 320 in FIGS. 3 and 4.

Figure 12A:
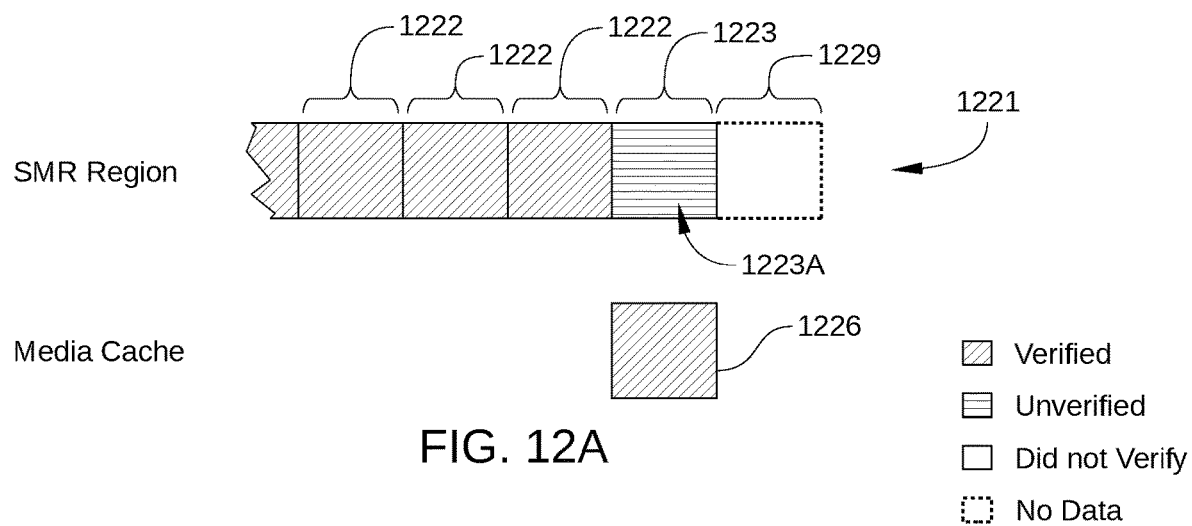
FIGS. 12A-12D schematically illustrate data stored in an SMR band and in a media-cache region of the hard disk drive of FIG. 1 when data are written to a last data storage track of an SMR band, according to an embodiment.

FIG. 12A schematically illustrates data stored in SMR band 1221 and in the media-cache region when HDD 100 when receiving a write command from a host that causes data to be written to last data storage track 1229, according to an embodiment. As shown, when HDD 100 receives the write command, data storage tracks 1222 store verified data (or other data that do not require verification), data storage track 1223 stores unverified data 1223A (that requires verification), and last data storage track 1229 stores no data. In the media-cache region, a verified copy 1226 is stored that is an accurate copy of unverified data 1223A currently stored in data storage track 1223. At the time that the write command is received, an abnormal operating condition of HDD 100 is detected. As a result, data stored in response to the write command require verification.

Figure 12B:
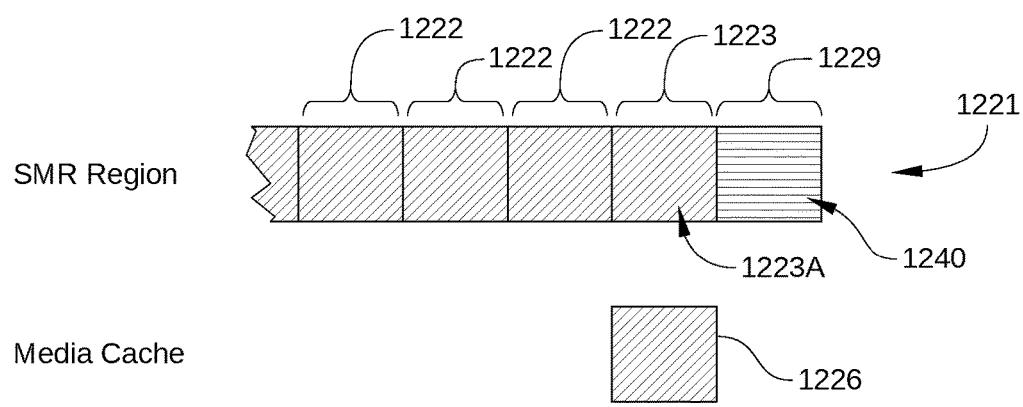

FIG. 12B schematically illustrates data stored in SMR band 1221 and in the media-cache region of HDD 100 after HDD 100 responds to the write command, according to an embodiment. As shown, additional data 1240 are stored in last data storage track 1229 of SMR band 1221. Because an abnormal operating condition of HDD 100 was detected at the time the write command was received by HDD 100, additional data 1240 are determined to be unverified (indicated by horizontal cross-hatching). In the embodiment shown in FIG. 12B, HDD 100 also verifies unverified data 1223A currently stored in data storage track 1223.

Figure 12C:
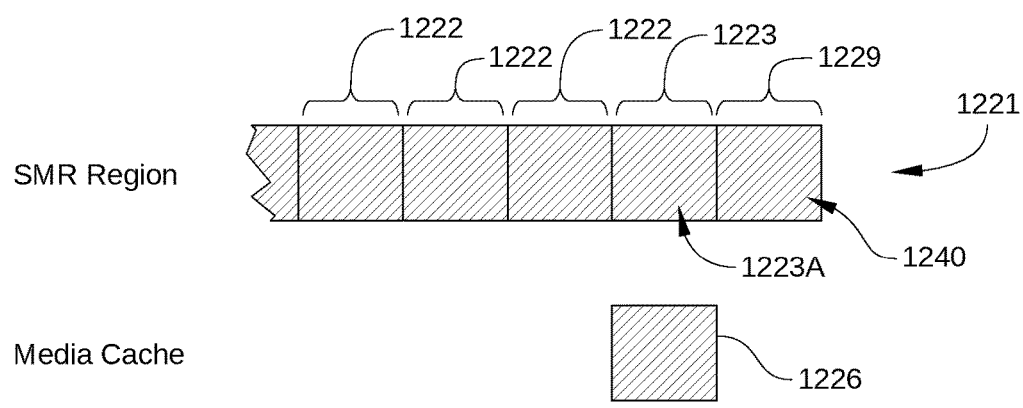

FIG. 12C schematically illustrates data stored in SMR band 1221 and in the media-cache region of HDD 100 after HDD 100 continues to respond to the write command, according to an embodiment. As shown, HDD 100 verifies additional data 1240 in SMR band 1221 without storing a verified copy of additional data 1240 in the media-cache region of HDD 100. For example, in one such embodiment, HDD 100 performs a write-verify operation when writing additional data 1240 in SMR band 1221, which can be performed in two revolutions of the recording surface that includes SMR band 1221. Thus, HDD 100 avoids performing an additional write-verify operation in the media-cache region of HDD 100 that is required to save a verified copy of additional data 1240 in the media-cache region of HDD 100.

In some embodiments, sectors of additional data 1240 that cannot be verified are rewritten. In such embodiments, because the data stored by last data storage track 1229 have not been partially overwritten by an adjacent data storage track in the radial direction, the sectors of last data storage track 1229 that cannot be verified can be selectively rewritten without damaging data stored in adjacent data storage tracks of SMR band 1221.

Figure 12D:
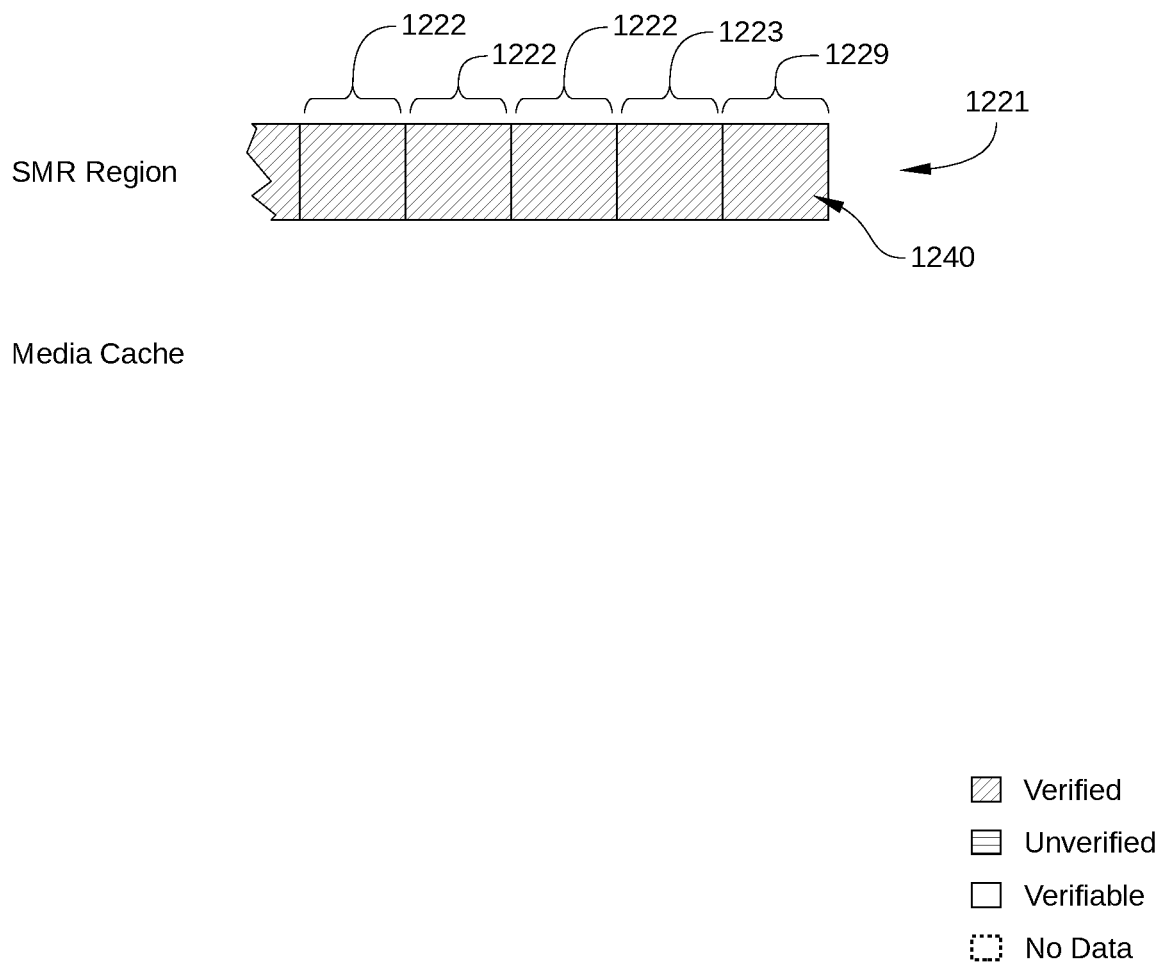

FIG. 12D schematically illustrates data stored in SMR band 1221 and in the media-cache region of HDD 100 after HDD 100 continues to respond to the write command, according to an embodiment. As shown, HDD 100 discards, deletes, removes, or otherwise renders invalid verified copy 1226 that is stored in the media-cache region of HDD 100. Thus, when SMR band 1221 is finished with the writing of additional data 1240 to last data storage track 1229, storage capacity of the media-cache region of HDD 100 is not reduced by storing verified copy 1226.

While the foregoing is directed to embodiments of the present invention, other and further embodiments of the invention may be devised without departing from the basic scope thereof, and the scope thereof is determined by the claims that follow.

We claim:

1. A disk drive comprising:
    a shingled magnetic recording region that includes a plurality of data storage bands including a first data storage band including a first track to which a first set of data has been written;
    a conventional magnetic recording region that includes a cache; and
    a controller configured to:
    upon receipt of a second set of data for storage from a host, determine whether an operating temperature of the disk drive is abnormal;
    upon determining that the operating temperature is not abnormal, write the second set of data to a second track of the first data storage band that partially overlaps the first track; and upon determining that the operating temperature is abnormal,
    write a first copy of the second set of data to the second track;
    write a second copy of the second set of data to the cache;
    verify the first set of data written to the first track; and
    after verifying the first set of data, invalidate a copy of the first set of data from the cache.

2. The disk drive of claim 1, wherein the controller is further configured to:
    after verifying the first set of data, determine that the second track is the last track of the first data storage band; and
    in response to determining that the second track is the last track of the first data storage band, verify the first copy of the second set of data written to the second track and invalidate the second copy of the second set of data from the cache.

3. The disk drive of claim 2, wherein the controller is further configured to determine that the second track is the last track of the first data storage band when a write pointer for the first data storage band is positioned at an end point of the first data storage band.

4. The disk drive of claim 2, wherein the second track is adjacent to the first track.

5. The disk drive of claim 1, wherein
    the second track is adjacent to the first track and overlaps the first track in the radial direction.

6. The disk drive of claim 5, wherein the first set of data is partially overwritten in the radial direction by the second track.

7. The disk drive of claim 5, wherein the controller is further configured to:
    determine that a first portion of the first set of data cannot be verified and a second portion of the first set of data can be verified; and
    retain in the cache a copy of the first portion of the first set of data and invalidate in the cache a copy of the second portion of the first set of data.

8. The disk drive of claim 7, wherein the controller is configured to determine that the first portion of the first set of data cannot be verified and the second portion of the first set of data can be verified in response to the second track overwriting the first set of data.

9. The disk drive of claim 7, wherein the controller is configured to determine that the first portion of the first set of data cannot be verified and the second portion of the first set of data can be verified in response to determining that the second track is the last track of the first data storage band.

10. The disk drive of claim 1, wherein the controller is further configured to:
    position a write pointer for the first data storage band at a start point of the first data storage band in response to receiving a command from a host; and
    in response to positioning the write pointer at the start point, invalidate data stored in the cache that is associated with the first data storage band.

11. The disk drive of claim 1, wherein the controller is further configured to:
    after writing the first copy and the second copy of the second set of data, receive a command to close the first data storage band; and
    verify the first copy in response to the command.

12. The disk drive of claim 11, wherein all portions of the second track are not overwritten by any adjacent track of the first data storage band.

13. The disk drive of claim 11, wherein the controller is further configured to, in response to the command:
    determine that a particular portion of data stored in the first data storage band cannot be verified; and
    in response to determining that the particular portion of data cannot be verified, retain a copy of the particular portion of data in the cache.

14. The disk drive of claim 11, wherein the controller is further configured to, in response to the command:
- determine that a particular portion of data stored the first data storage band is verified; and
- in response to determining that the particular portion of data is verified, invalidate a copy of the particular portion of data in the cache.

15. The disk drive of claim 11, wherein the controller is further configured to:
- receive a command to open the first data storage band after receiving the command to close the first data storage band; and
- in response to the command to open the first data storage band, copy to the cache data written to a third track of the first data storage band that has most recently had data appended thereto.

16. The disk drive of claim 15, wherein the controller is further configured to:
- write data to a fourth track of the first data storage band after copying to the cache the data written to the third track of the first data storage band, wherein the fourth track is adjacent to the third track and radially overlaps a portion of the third track; and
- prior to writing the data to the fourth track, store a copy of data stored in the portion of the third track to the cache.

17. The disk drive of claim 16, wherein the controller is further configured to:
- after storing the copy of the data stored in the portion of the third track to the cache, verify the data stored in the portion of the third track; and
- in response to verifying the data stored in the portion of the third track, invalidating in the cache the copy of the data stored in the portion of the third track.

18. The disk drive of claim 1, wherein the controller is further configured to, upon determining that the operation temperature is abnormal and prior to writing the first copy of the second set of data to the second track, store the copy of the first set of data written to the first track in the cache.

19. The disk drive of claim 1, wherein the first set of data written to the first track is verified using the copy of the first set of data stored in the cache.

* * * * *

UNITED STATES PATENT AND TRADEMARK OFFICE
CERTIFICATE OF CORRECTION

PATENT NO. : 11,422,710 B2
APPLICATION NO. : 16/994375
DATED : August 23, 2022
INVENTOR(S) : Richard M. Ehrlich et al.

It is certified that error appears in the above-identified patent and that said Letters Patent is hereby corrected as shown below:

In the Claims

In Column 21, Claim 14, Line 3, please insert --in-- after "stored".

Signed and Sealed this
Twenty-fourth Day of January, 2023

*Katherine Kelly Vidal*

Katherine Kelly Vidal
*Director of the United States Patent and Trademark Office*